(12) United States Patent
Iwase

(10) Patent No.: US 8,942,350 B2
(45) Date of Patent: Jan. 27, 2015

(54) RADIOGRAPHIC SYSTEM AND RADIOGRAPHIC APPARATUS

(75) Inventor: Ryotaro Iwase, Hino (JP)

(73) Assignee: Konica Minolta Medical & Graphic, Inc. (JP)

( * ) Notice: Subject to any disclaimer, the term of this patent is extended or adjusted under 35 U.S.C. 154(b) by 409 days.

(21) Appl. No.: 13/489,657

(22) Filed: Jun. 6, 2012

(65) Prior Publication Data
US 2012/0321047 A1  Dec. 20, 2012

(30) Foreign Application Priority Data

Jun. 20, 2011 (JP) .................. 2011-136056

(51) Int. Cl.
*H05G 1/64* (2006.01)
*H05G 1/56* (2006.01)
*G01T 1/24* (2006.01)

(52) U.S. Cl.
CPC .............. *G01T 1/247* (2013.01); *G01T 1/243* (2013.01); *Y10S 378/901* (2013.01)
USPC ......................... 378/98.2; 378/901

(58) Field of Classification Search
USPC ............. 378/62, 91, 98, 98.2, 98.8, 114, 204, 378/210, 901
See application file for complete search history.

(56) References Cited

U.S. PATENT DOCUMENTS

2009/0220048 A1*  9/2009  Ohta et al. .................. 378/98

FOREIGN PATENT DOCUMENTS

| JP | 6-342099 A | 12/1994 |
|---|---|---|
| JP | 9-73144 A | 3/1997 |
| JP | 2002-330429 A | 11/2002 |
| JP | 2006-58124 A | 3/2006 |

* cited by examiner

*Primary Examiner* — Anastasia Midkiff
(74) *Attorney, Agent, or Firm* — Cantor Colburn LLP

(57) ABSTRACT

A radiographic system includes: a radiographic apparatus; a radiation generator that irradiates radiation to the radiographic apparatus; and a console which forms a radiation image based on an image data transmitted from the radiographic apparatus, wherein when a radiation image capturing is completed, a controller transmits thinned-out data in which read-out image data are thinned at a prescribed ratio, to the console, which displays a preview image on a display section based on the thinned-out data, when a rejection operation that rejects the preview image through an input section is conducted, the console transmits a stop signal that instructs the radiographic apparatus to stop a series of processing, and wherein when the controller receives the stop signal, the controller stops the series of processing currently in progress, and returns an operation state of each functional section to an operation state before the radiation image capturing is carried out.

10 Claims, 26 Drawing Sheets

FIG. 9
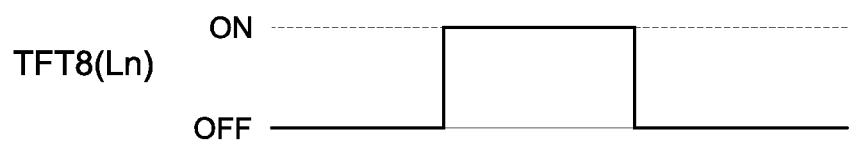
FIG. 10
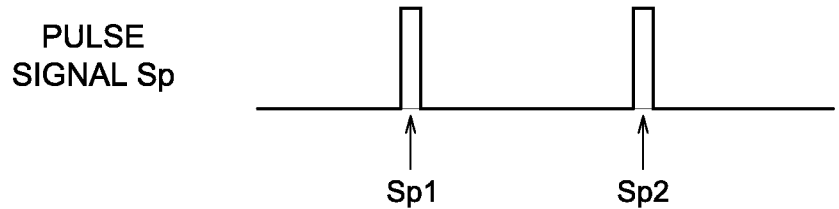
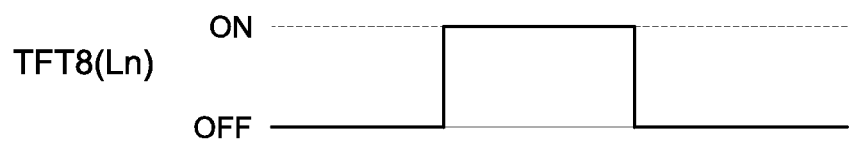

FIG. 25

|     |         |         |         |         |         |   |
|-----|---------|---------|---------|---------|---------|---|
| L1  | D(1,1)  | D(1,2)  | D(1,3)  | D(1,4)  | D(1,5)  |   |
| L2  | D(2,1)  | D(2,2)  | D(2,3)  | D(2,4)  | D(2,5)  |   |
| L3  | D(3,1)  | D(3,2)  | D(3,3)  | D(3,4)  | D(3,5)  |   |
| L4  | D(4,1)  | D(4,2)  | D(4,3)  | D(4,4)  | D(4,5)  |   |
| L5  | D(5,1)  | D(5,2)  | D(5,3)  | D(5,4)  | D(5,5)  |   |
| L6  | D(6,1)  | D(6,2)  | D(6,3)  | D(6,4)  | D(6,5)  |   |
| L7  | D(7,1)  | D(7,2)  | D(7,3)  | D(7,4)  | D(7,5)  |   |
| L8  | D(8,1)  | D(8,2)  | D(8,3)  | D(8,4)  | D(8,5)  |   |
| L9  | D(9,1)  | D(9,2)  | D(9,3)  | D(9,4)  | D(9,5)  |   |
| L10 | D(10,1) | D(10,2) | D(10,3) | D(10,4) | D(10,5) |   |
| L11 | D(11,1) | D(11,2) | D(11,3) | D(11,4) | D(11,5) |   |
| L12 | D(12,1) | D(12,2) | D(12,3) | D(12,4) | D(12,5) |   |

RADIOGRAPHIC SYSTEM AND RADIOGRAPHIC APPARATUS

This application is based on Japanese Patent Application No. 2011-136056 filed on Jun. 20, 2011, which is incorporated hereinto by reference.

BACKGROUND OF THE INVENTION

The present invention relates to a radiographic system and a radiographic apparatus, and in particular to a radiographic apparatus which obtains image data and a radiographic system being provided with a console which generates a radiographic image based on the image data.

There have been developed a variety of radiographic apparatuses including a so-called direct type radiographic apparatus, which generates charges with a detection element in accordance with the amount of irradiated radiation such as x-rays and converts them into electric signals, and a so-called indirect type radiographic apparatus, which converts, with a scintillator or the like, irradiated radiation into electromagnetic waves having different wavelength such as a visible light, after which, according to energy of the converted and irradiated electromagnetic wave, generates charges and converts them into electric signals with a photoelectric conversion element such as a photodiode. In the present invention, the detection element in the direct type radiographic apparatus, and the photoelectric conversion element in the indirect type radiographic apparatus are collectively referred to as a radiation detection element.

The radiographic apparatuses of this type are known as a FPD (Flat Panel Detector), which previously had been formed integrally with a supporting table and the like (refer, for example, to Japanese Patent Application Publication No. H09-73144). However, in recent years, a portable radiographic apparatus, in which a radiation detection element and the like are stored in a housing, was developed and has been practically used (refer, for example, to Japanese Patent Application Publication Nos. 2006-058124 and H06-342099).

In such radiographic apparatus and radiographic system using the same, there is carried out reset processing of each radiation detection element 7 (refer, for example, to FIG. 7 or the like, which is described later), which releases charges remaining in each radiation detection element 7, prior to radiation image capturing, as it is described in, for example, Japanese Patent Application Publication No. 2002-330429.

When irradiation of radiation to radiographic apparatus is initiated, an OFF voltage is applied to each scanning line 5, and then, each switching unit 8, which is composed of a thin film transistor (hereinafter it is referred to as TFT), is turned to be OFF, and thereby the apparatus becomes an electric charge accumulation state in which charges generated by the irradiation of radiation are accumulated in each radiation detection element 7.

After image data D are read out from each radiation detection element 7, thinned-out data Dt, in which the read-out image data are thinned out at a prescribed rate, are transmitted to console 58 (refer, for example, to FIG. 11 or FIG. 12, which is described below), and then, a preview image (a simple image) is displayed on display section 58a of console 58. Console 58 is equivalent to a control PC in Japanese Patent Application Publication No. 2002-330429.

In the radiographic apparatus, when thinned-out data Dt were transmitted, after remaining image data D are transmitted, a reset process of each radiation detection element 7 is again carried out After that, there is carried out read-out processing of offset data O, which reads out, as offset data O, offset equivalence originated in dark charges (also referred to as dark current) superimposed on image data D which were read out for each radiation detection element 7.

Then, each of offset data O, which were read out by the read out processing of offset data O, is transmitted to console 58. After that, in console 58, image processing is carried out for image data D or offset data O to generate the final radiation image. The radiographic apparatus or the radiographic system may be constituted in such a way as described above.

However, if the radiographic system is constituted in such a way as described above, for example, a subject may not be captured due to some causes in a preview image displayed on display section 58a of console 58, or a subject may not be captured at an appropriate position in an image.

In such a case, in a radiographic system such as described above, even if a radiological technologist who observed a preview image determines that image re-capturing is needed, the radiographic apparatus automatically successively carries out, as described above, a transmission of remaining image data D, second reset processing of each radiographic detection element 7, a read-out processing of offset data O, a transmission of offset data O, and the like.

Due to the reason, a radiological technologist sometimes could not carry out an image re-capturing until the above series of processing are completed. However, with this situation, it becomes inconvenient for the radiological technologist to use the radiographic system.

In addition, in a case where the radiographic apparatus is one incorporating a battery which supplies a power to each functional section, since the radiographic apparatus sends image data D which makes no sense to be transmitted, or a read-out processing or a transmission of unnecessary offset data O is carried out the power of the battery equivalent to the above useless actions is wasted. Then, there was a possibility of a problem that the battery runs out of power in a shorter time and thereby an image capturing efficiency per battery charging is lowered.

SUMMARY OF THE INVENTION

The present invention has been achieved in consideration of the above problems, and it is an object of the invention to provide a radiographic system in which an image re-capturing can be immediately made when image re-capturing is needed. Also it is another object of the invention to provide a radiographic system in which exhaustion of battery can be prevented without performing unnecessary processing when image re-capturing is needed.

To solve the above problem, the radiographic system and the radiographic apparatus of the present invention is provided with a radiographic apparatus comprising a plurality of scanning lines and a plurality of signal lines which are arranged so as to be crossed with each other, a plurality of radiation detection elements which are arranged in two-dimensionally in each of small areas which are divided by the above plurality of scanning lines and signal lines, a scanning driving section which applies an ON voltage or an OFF voltage to the above each scanning line, a switching unit which is connected with the above each scanning line and, when an ON voltage is applied, releases charges accumulated in the above radiation detection elements into the above signal lines, a read-out circuit which reads out the above charges released from the above radiation detection elements by converting them into image data, a controller which controls at least the above scanning driving section and the above read-out circuit to allow read-our processing of the above image data from the above radiation detection elements, and a communication section which is communicable with exterior devices; a radiation generator provided with a radiation source which irradiates radiation to the above radiographic apparatus, and a console which forms a radiation image based on the above image data being transmitted from the above radiographic apparatus, wherein the above controller of the above radiographic apparatus, when completing radiation image capturing, transmits thinned-out data, in which the above read-out image data are thinned at a prescribed rate, to the above console, and the above console displays a preview image on a display section based on the above thinned-out data; in a case where there was carried out an operation that the aforesaid preview image was rejected through an input unit, transmits a stop signal which instructs to stop a series of processing to the above radiographic apparatus, and the above controller of the above radiographic apparatus, when receives the above stop signal from the above console, stops a series of processing which have been carried out at that time, and returns the working conditions of each functional section including the above scanning driving section to working conditions of pre-radiation image capturing.

BRIEF DESCRIPTION OF THE DRAWINGS

FIG. 9 is a timing chart showing a switch for resetting electric charge in a reset processing of each radiation detection element, and ON and OFF timing for TFT.

FIG. 10 is a timing chart showing a switch for resetting electric charge in a read-out processing of image data, pulse signals, and ON and OFF timing for TFT.

FIG. 25 is a figure describing an example of an extraction method of thinned-out data from image data.

DETAILED DESCRIPTION OF THE PREFERRED EMBODIMENT

Hereinafter, an embodiment of the radiographic system and the radiographic apparatus relating to the present invention is described with reference to figures.

In the following description, as a radiographic apparatus, there is described a so-called indirect type radiographic apparatus being provided with a scintillator and the like, which apparatus converts irradiated radiation into electromagnetic waves having different wavelength such as a visible light to obtain electric signals. However, the present invention may also be applied to a so-called direct type radiographic apparatus which directly detects radiation with a radiation detection element without a scintillator or the like.

Further, it is possible that the present invention is applied not only to a so-called portable radiographic apparatus in which sensor panel SP is stored in housing 2, but also to a specialized radiographic apparatus which is, for example, integrally formed with a supporting table and the like.

[Radiographic Apparatus]

Figure 1:
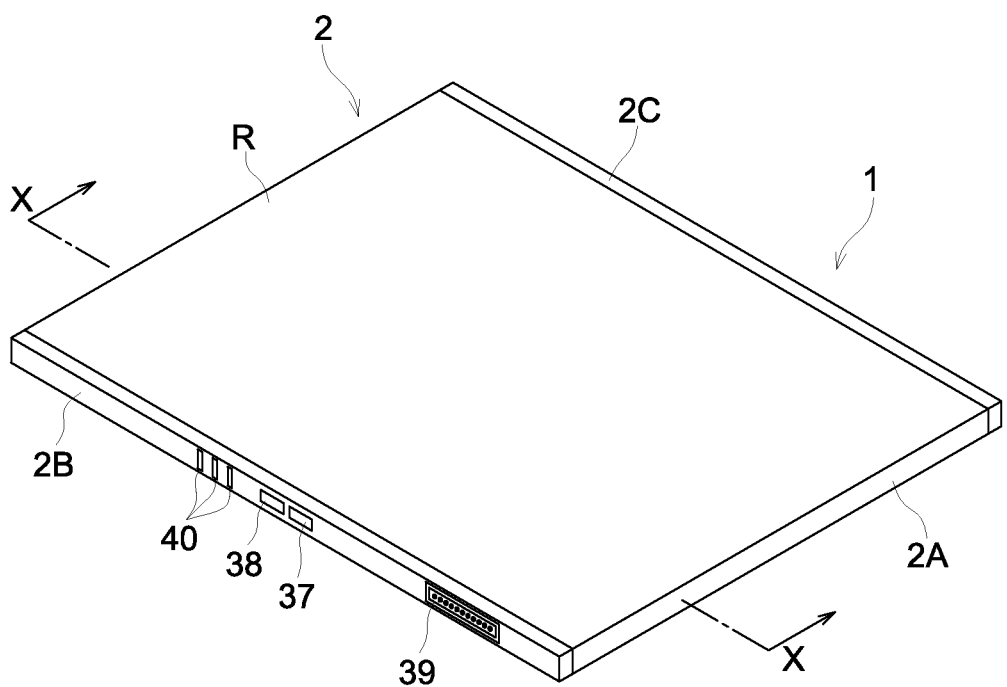
FIG. 1 is a perspective view showing an exterior of the radiographic apparatus relating to the present embodiment.
Figure 2:
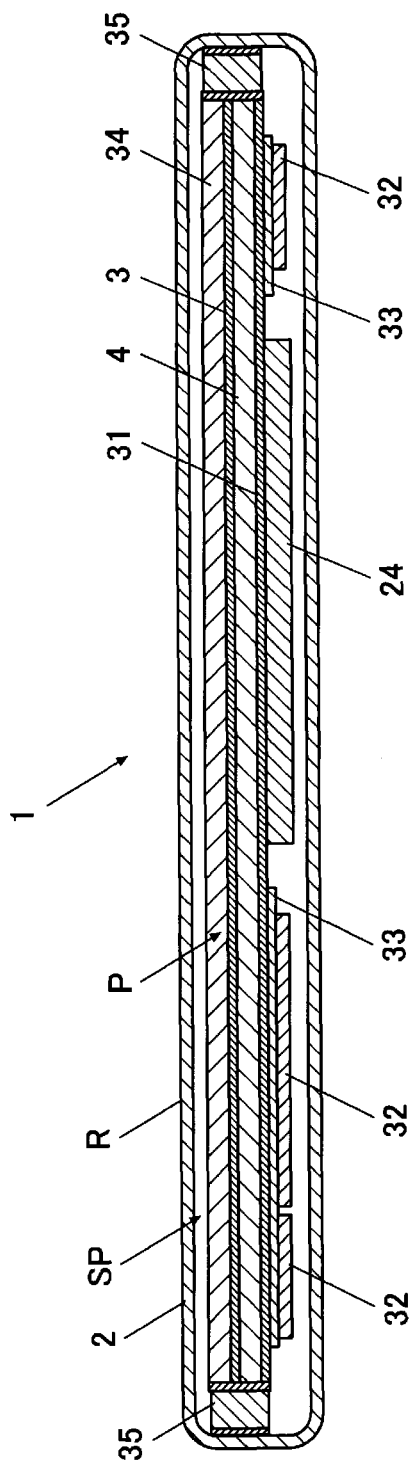
FIG. 2 is a sectional view along the X-X line of FIG. 1.

FIG. 1 is a perspective view showing an exterior of the radiographic apparatus relating to the present embodiment, and FIG. 2 is a sectional view along an X-X line of FIG. 1. In the present embodiment, in radiographic apparatus 1, as it is shown in FIG. 1 or FIG. 2, sensor panel SP constituted by scintillator 3, board 4 and the like is stored in case type housing 2.

In the present embodiment, rectangular roll type hollow housing body 2A having radiation incidence plane R of case 2 is formed with a material such as a carbon plate and plastics, through which radiation passes through, and case 2 is formed by blocking openings at the both sides of housing body 2A with cover members 2B and 2C.

On cover member 2B at one side of case 2, there are arranged elements such as electric power switch 37, changeover switch 38, connector 39, and indicator 40 composed of an LED or the like which displays a battery condition, a running condition of radiographic apparatus 1, or the like.

Figure 3:
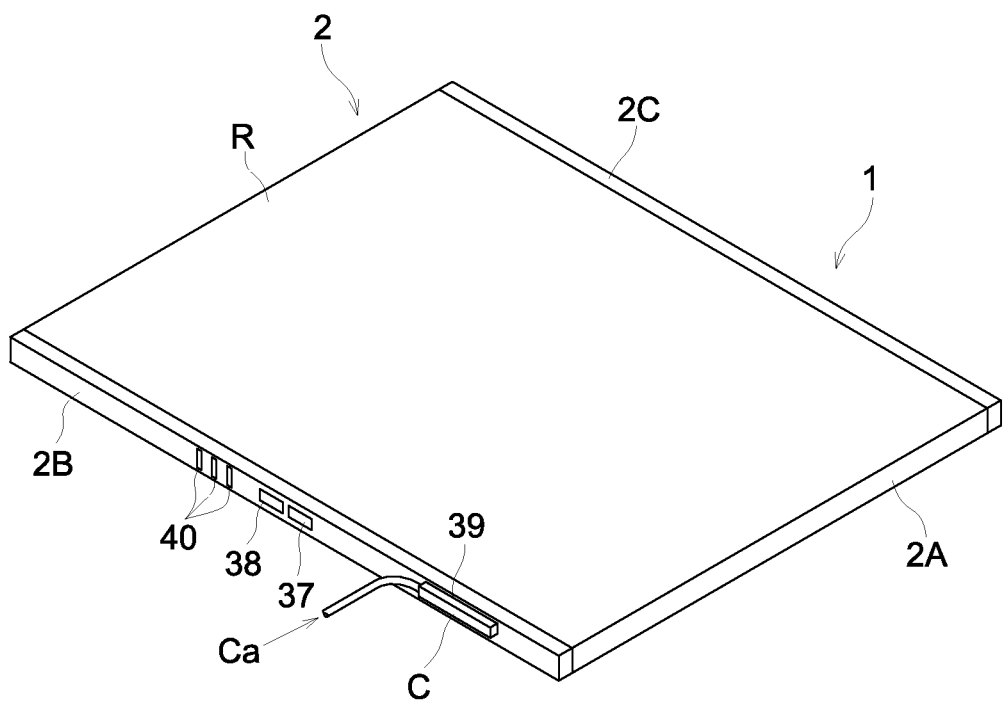
FIG. 3 is a perspective view showing an exterior of the radiographic apparatus in a state that a cable is connected.

As it is shown in FIG. 3, in the present embodiment, connector C, which is arranged at the tip of cable Ca, is made so as to be connected with connector 39. The connection of connector 39 with cable Ca makes it possible that, for example, signals or the like are sent or received between console 58, which is described below (refer to FIG. 11 or FIG. 12), or image data D or the like are sent to console 58.

Though an illustration is omitted, antenna device 41 (refer to FIG. 7, which is described below) is arranged at, for example, cover member 2C or the like which is located at the opposite side of case 2 by, for example, implanting it in cover member 2C. In this way, in the present embodiment, connector 39 and antenna device 41 are made so that they send and receive signals between radiographic apparatus 1 and console 58, and thereby they function as a communication unit to transmit image data D or the like to console 58.

As it is shown in FIG. 2, at the inside of case 2, there is arranged board 4 through a non-illustrated thin lead plate or the like on the upper surface side of base 31, and there is attached PCB board 33 on which electronic part 32 or the like is disposed, battery 24, or the like on the lower surface side of base 31. Further, on radiation incidence plane R side of board 4 or scintillator 3, glass board 34 is arranged to protect them. Furthermore, in the present embodiment, between case 2 and base 31, board 4 or the like, there is arranged buffer material 35 to prevent them from hitting each other.

Scintillator 3 is arranged at a position opposing to detection section P, which is described below, of board 4. In the present embodiment, as scintillator 3, there is used a material having, for example, a phosphor as a main ingredient, and which, after receiving radiation, converts it into electromagnetic waves having a wavelength of 300 to 800 nm, namely waves centering on visible light and outputs them.

Figure 4:
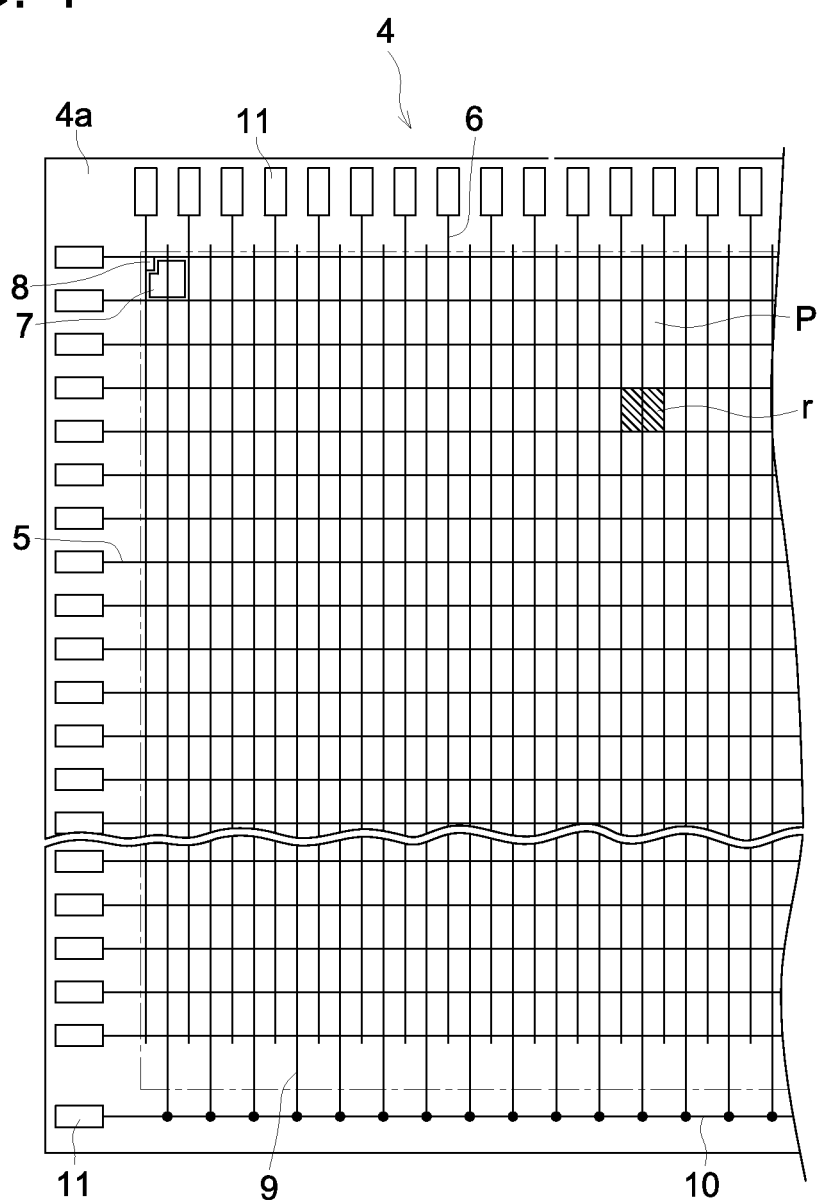
FIG. 4 is a plan view showing a constitution of a board of the radiographic apparatus.

Board 4 is, in the present embodiment, made of a glass board, and, as it is shown in FIG. 4, on surface 4a of board 4 on the opposing side to scintillator 3, there are arranged a plurality scanning lines 5 and a plurality of signal lines 6 so as to be crossed with each other. In each of small areas "r" which are divided by the above plurality of scanning lines and signal lines on surface 4a of board 4, each of radiation detection elements 7 is disposed.

In this way, the whole of small areas "r", in which a plurality of radiation detection elements 7 are arranged in two-dimensionally in each of small areas "r" which are divided by scanning lines and signal lines, is referred to as detection section P.

Figure 5:
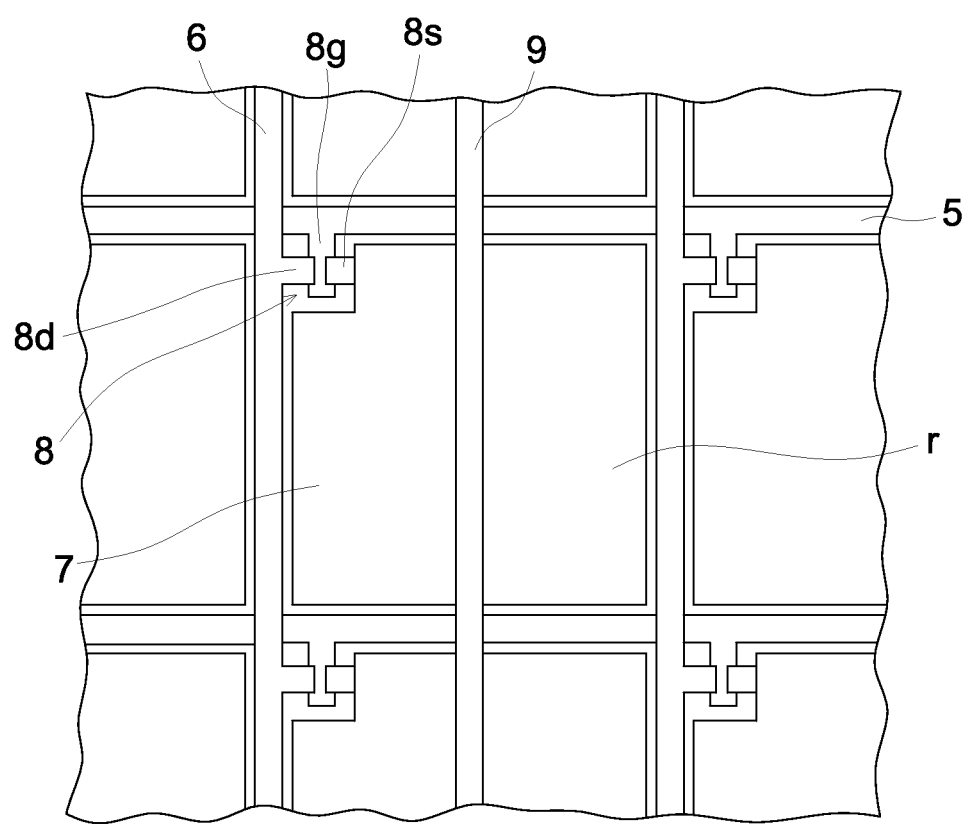
FIG. 5 is an enlarged view showing a constitution of radiation detection elements, TFTs, and the like, formed on small areas on the board of FIG. 4.

In the present embodiment, a photodiode is used as radiation detection element 7, but other than that, for example, a phototransistor or the like may be used. Each radiation detection element 7 is, as it is shown in FIG. 5 which is an enlarged figure of FIG. 4, connected with source electrode 8s of TFT 8, which is a switching unit. Drain electrode 8d of TFT 8 is connected with signal line 6.

Radiation detection element 7 generates an electron hole pair at the inside thereof when radiation is irradiated from radiation incidence plane R of case 2 of radiographic apparatus 1, and electromagnetic waves such as a visible light, which were converted from radiation by scintillator 3, are irradiated. In such a way, radiation detection element 7 is made so as to converts irradiated radiation (in the present embodiment, electromagnetic waves converted from the radiation by scintillator 3) into charges.

TFT 8 is made in such a way that it becomes an ON state when an ON voltage is applied to gate electrode 8g from scanning driving section 15, which is described below, through scanning line 5, and then, releases charges having been accumulated in radiation detection element 7 to signal line 6 through source electrode 8s and drain electrode 8d. In addition, TFT 8 is made so that it becomes an OFF state when an OFF voltage is applied to gate electrode 8g through connected scanning line 5, and stops release of charges from radiation detection element 7 to signal line 6, to accumulate charges in radiation detection element 7.

In the present embodiment, as it is shown in FIG. 5, a piece of bias line 9 is connected to a plurality of radiation detection elements 7, each of which is arranged in a line, and, as it is shown in FIG. 4, each bias line 9 is disposed in parallel to each signal line 6. Further, each bias line 9 is connected to connection line 10.

In the present embodiment, as it is shown in FIG. 4, each of scanning lines 5, each of signal lines 6, connection line 10 of bias lines 9 are connected with each of input-output terminals 11 (also referred to as a pad), which are arranged near edge parts of board 4.

Flexible circuit board 12 (also referred to as a chip on film, or the like), in which chips such as gate IC 15c composing gate driver 15b of scanning driving section 15, which is described below, are incorporated on a film, is connected with each input-output terminal 11 through anisotropic conductive adhesive material 13 such as an anisotropic conductive film and an anisotropic conductive paste.

Figure 6:
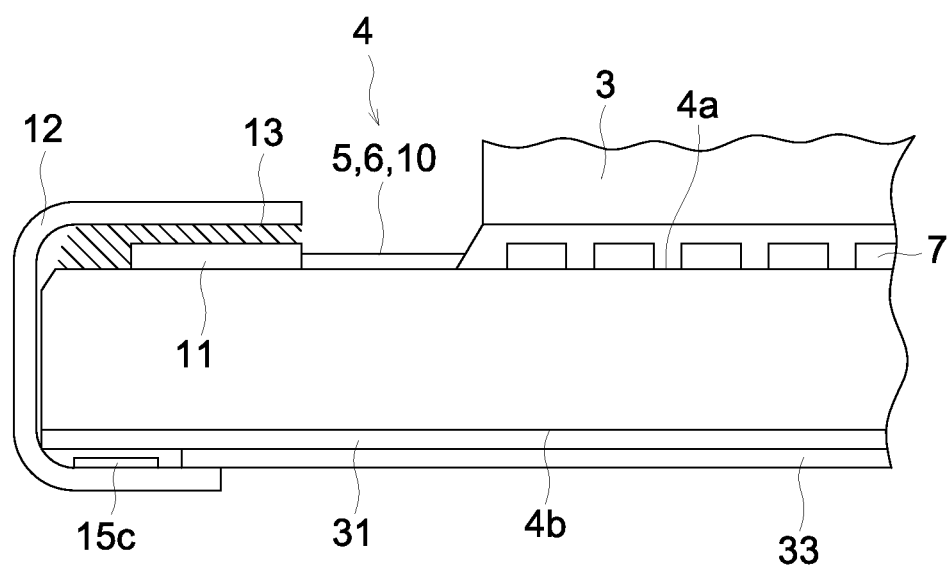
FIG. 6 is a side view describing a board on which flexible circuit boards, PCB boards and the like are attached.

Flexible circuit board 12 is configured so that it is drawn around to back surface 4b of board 4, and is connected with aforesaid PCB board 33 at back surface 4b. In this way, sensor panel SP of radiographic apparatus 1 is formed. In FIG. 6, illustrations of electronic part 32 and the like are omitted.

Figure 7:
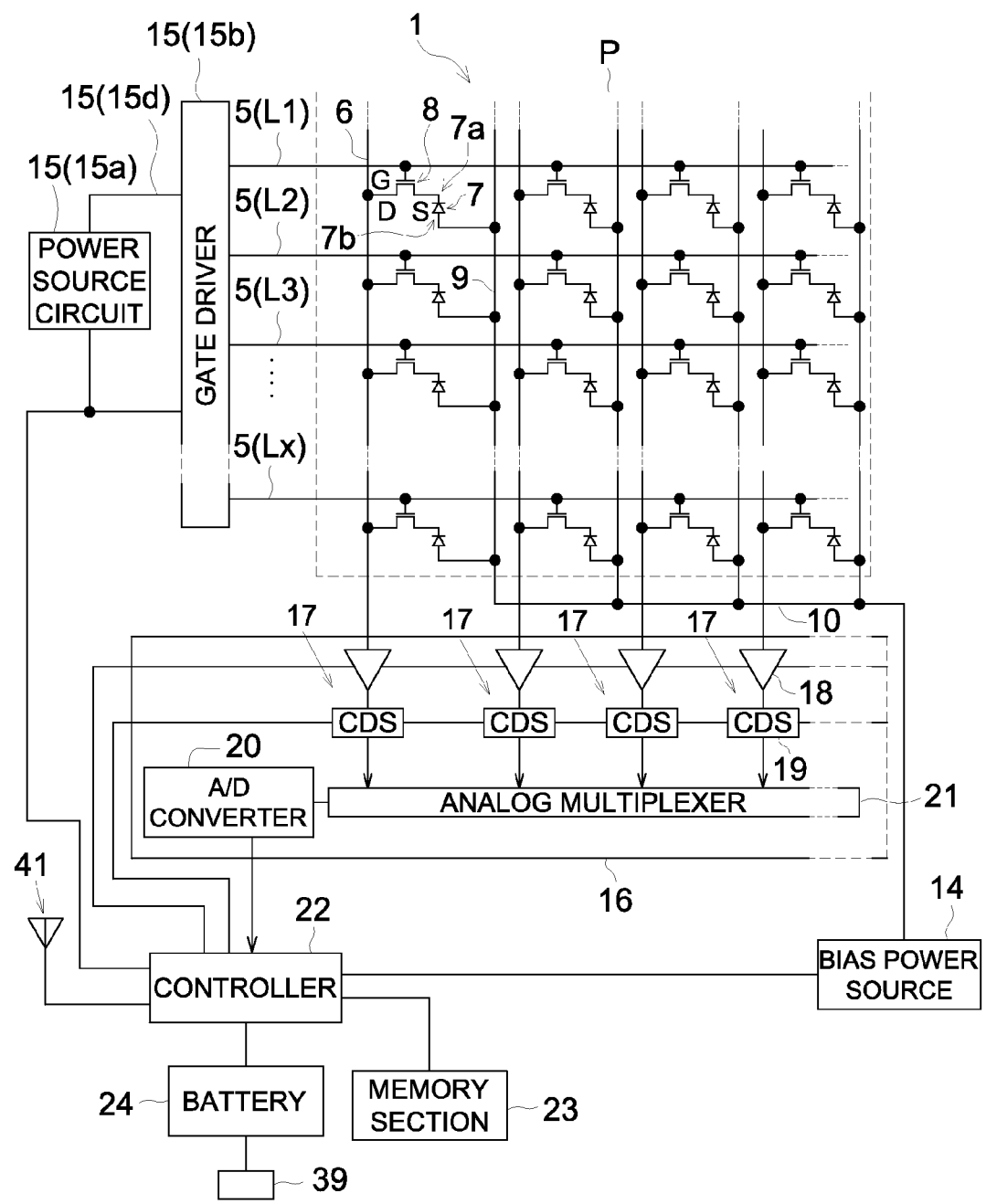
FIG. 7 is a block diagram showing an equivalent circuit of the radiographic apparatus.

Hereinafter, a circuit configuration of radiographic apparatus 1 is described. FIG. 7 is a block diagram showing an equivalent circuit of radiographic apparatus 1 relating to the present embodiment, and FIG. 8 is a block diagram showing an equivalent circuit of one pixel constituting detection section P.

As it was described above, each bias line 9 is connected with second electrode 7b of each radiation detection element 7 of detection section P of board 4, and each bias line 9 is connected with connection line 10, which is then connected with bias power source 14. Bias power source 14 is made to apply a bias voltage to each second electrode 7b of each radiation detection element 7 through connection line 10 and each bias line 9. Further, bias power source 14 is made to be connected with controller 22, which is described below, and the bias voltage, which is applied to each radiation detection element 7 from bias power source 14, is controlled by controller 22.

Figure 8:
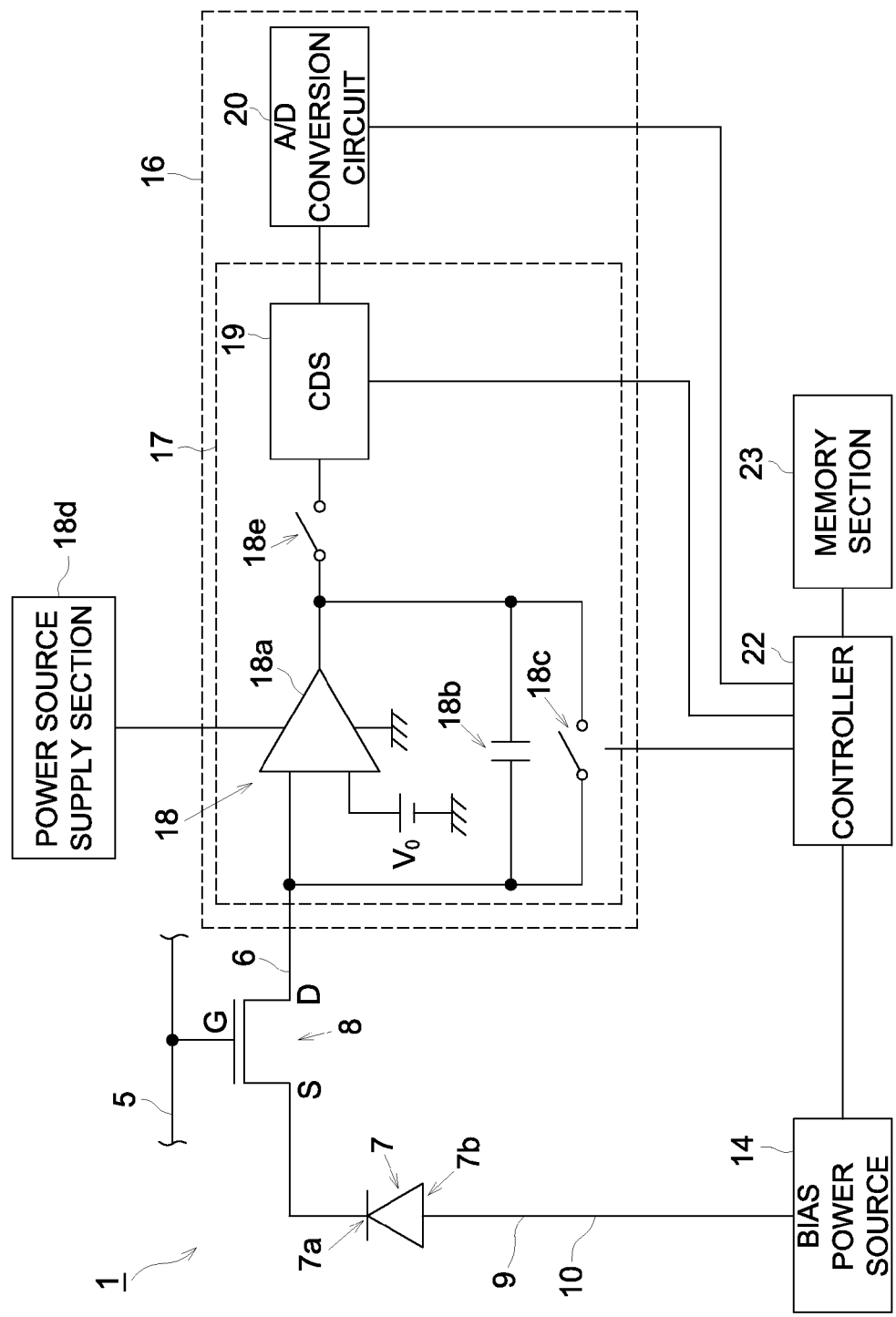
FIG. 8 is a block diagram showing an equivalent circuit of one pixel constituting a detection section.

As it is shown in FIGS. 7 and 8, in the present embodiment, it is designed so that, from bias power source 14, a voltage lower than a voltage applied to first electrode 7a of radiation detection element 7 (namely a so-called a reverse bias voltage) is applied as a bias voltage to second electrode 7b of radiation detection element 7 through bias line 9.

Scanning driving section 15 is provided with electric power circuit 15a, which supplies through wiring 15d an ON voltage and an OFF voltage to gate driver 15b, and gate driver 15b, which switches between ON and OFF of each TFT 8 by switching a voltage applying to each of lines L1 to Lx of scanning line 5 between an ON voltage and an OFF voltage.

As it is shown in FIGS. 7 and 8, each signal line 6 is connected to each read-out circuit 17 embedded in read-out IC 16. Read-out circuit 17 is constructed by amplifying circuit 18, correlated double sampling circuit 19, and the like. Inside of read-out IC 16, there are further arranged analog multiplexer 21 and A/D converter 20. In FIGS. 7 and 8, correlated double sampling circuit 19 is written as CDS. In FIG. 8, analog multiplexer 21 is omitted.

In the present embodiment, amplifying circuit 18 is constituted of operational amplifier 18a and a charge amplifier circuit, in which each of condenser 18b and switch 18c for resetting electric charge are connected in parallel with operational amplifier 18a, and which charge amplifier circuit is provided with power source supply section 18d which supplies power to operational amplifier 18a and the like. It is configured so that signal line 6 is connected with an inverting input terminal located at the input side of operational amplifier 18a of amplifying circuit 18, and reference potential $V_o$ is applied to the non-inverting input terminal located at the input side of amplifying circuit 18. Reference potential $V_0$ may be set at an arbitrary value, and, in the present embodiment, for example, 0 [V] is set to be applied.

Further, switch 18c for resetting electric charge of amplifying circuit 18 is made so that it is connected with controller 22, and ON and OFF is controlled by controller 22. In addition, between operational amplifier 18a and correlated double sampling circuit 19, there is arranged switch 18e, which opens and closes in conjunction with switch 18c for resetting electric charge, and switch 18e is made to perform an ON and OFF action in conjunction with an ON and OFF action of switch 18c for resetting electric charge.

In radiographic apparatus 1, when a reset processing of each radiation detection element 7 is carried out to remove charges remaining in each radiation detection element 7, as it is shown in FIG. 9, each TFT 8 is set to be an ON condition, in a state that switch 18c for resetting electric charge is set to be an ON condition (and switch 18e is set to be an OFF condition).

Then, charges are released from each radiation detection element 7 to signal line 6 through each TFT 8, pass through switch 18c for resetting electric charge of amplifying circuit 18, and then the charges go inside of operational amplifier 18a from the side of output terminal of operational amplifier 18a, and go out of non-inverting input terminal to be earthed or flow out to power source supply section 18d. In this way, it is designed so that reset processing of each radiation detection element 7 is carried out.

On the other hand, in carrying out read-out processing of image data D from each radiation detection element 7, or read-out processing of image data d for studying the start of irradiation, which is described below, as it is shown in FIG. 10, if charges are released from each radiation detection element 7 to signal line 6 through each TFT 8 which was set in an ON condition, in a state that switch 18c for resetting electric charge of amplifying circuit 18 is allowed to be in an OFF condition (and switch is an ON condition), the charges are accumulated in condenser 18b of operational amplifier 18.

Amplifying circuit 18 is made so that the voltage value corresponding to charges accumulated in condenser 18b is output from the output side of operational amplifier 18a. Correlated double sampling circuit 19 (CDS), when pulse signal Sp1 (refer to FIG. 10) is transmitted from controller 22 before charges flow out of each radiation detection element 7, keeps voltage value Vin which has been output from amplifying circuit 18 at the time of transmission.

Then, after the charges flew out of each radiation detection element 7 are accumulated in condenser 18b of amplifying circuit 18, when pulse signal Sp2 is transmitted from controller 22, correlated double sampling circuit 19 keeps voltage value Vfi which has been output from amplifying circuit 18 at the time of transmission. Then, the difference Vfi-Vin of the voltage value is calculated, which is then output to the downstream side as image data D of analogue value.

It is designed so that image data D of each radiation detection element 7 having been output from correlated double sampling circuit 19 are, through analogue multiplexer 21, successively transmitted to A/D converter 20, and then successively converted to digital image data D at A/D converter 20, which data are then output to memory section 23 to be successively kept.

Controller 22 is constituted of a computer, in which non-illustrated CPU (central processing unit), ROM (read only memory), RAM (random access memory), input-output interface, and the like are connected with a bus, FPGA (field programmable gate array) or the like. Controller 22 may be constituted of an exclusive control circuit.

Controller 22 is made to control an action or the like of each member of radiographic apparatus 1. In addition, as it is shown in FIG. 7 or other figures, memory section 23 constituted of SRAM (static RAM), SDRAM (synchronous DRAM), and the like is connected with controller 22.

Further, in the present embodiment, with controller 22, there is connected aforementioned antenna device 41, and further is connected battery 24 which supplies electric power to each of members such as detection section P, scanning driving section 15, read-out circuit 17, memory section 23, and bias power source 14. Battery 24 is connected with aforementioned connector 39, and thereby, in charging battery 24, electric power is supplied from non-illustrated charging equipment through connector 39.

As it was described above, controller 22 is made to control an action of each functional section of radiographic apparatus 1, such as setting or varying a bias voltage which is applied to each radiation detection element 7 from bias power source 14 by controlling bias power source 14.

[Radiographic System]

Figure 11:
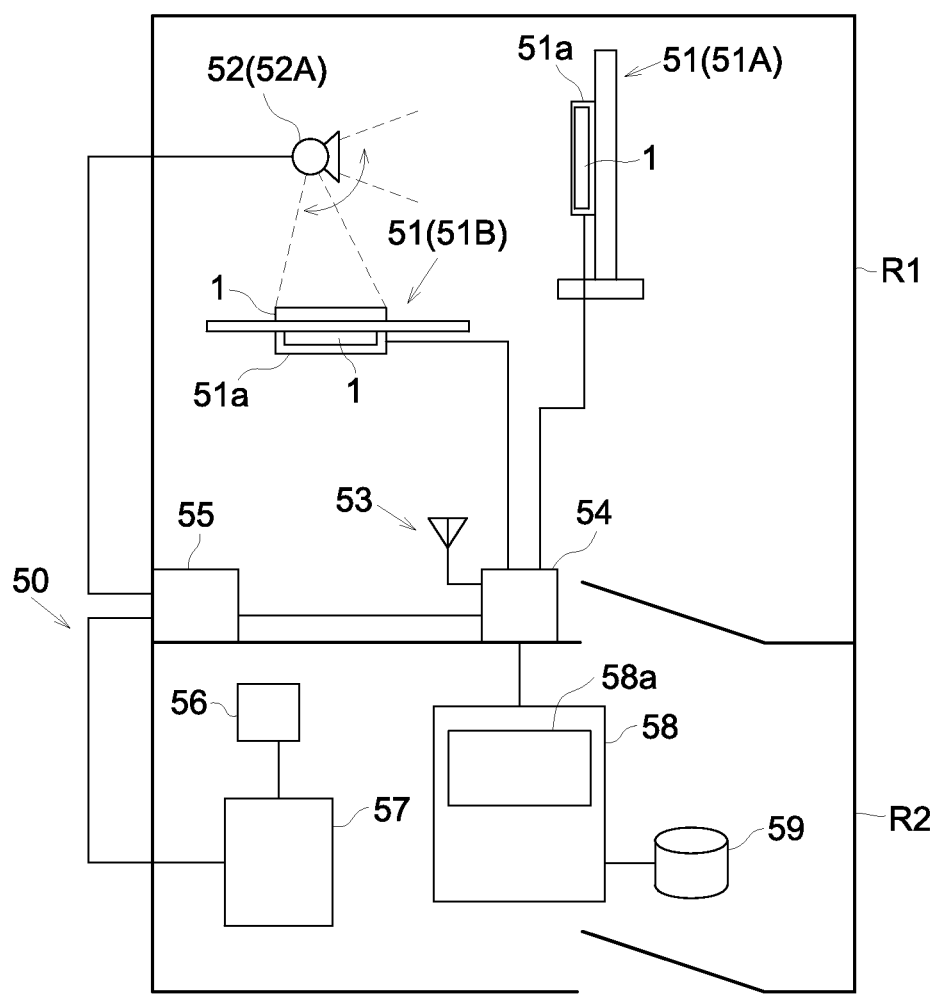
FIG. 11 is an illustration showing a configuration example of the radiographic system relating to the present embodiment constructed in an image capturing room.

Next, radiographic system 50 relating to the present embodiment is described. FIG. 11 is an illustration showing a configuration example of radiographic system 50 relating to the present embodiment. In FIG. 11, there is shown a case where radiographic system 50 is constructed in image capturing room R1 or the like.

In image capturing room R1, bucky apparatus 51 is installed, and bucky apparatus 51 is assembled to use in such a way that above radiographic apparatus 1 can be loaded in cassette holding part 51a (also referred to as a cassette holder) of bucky apparatus 51. In FIG. 11, as bucky apparatus 51, there is shown a case where bucky apparatus 51A to image patients in an upright position and bucky apparatus 51B to image patients in a spine position. However, for example, there may be installed only bucky apparatus 51A to image patients in an upright position or only bucky apparatus 51B to image patients in a spine position.

In the present embodiment, as it was shown in FIG. 3, it is it is configured in such a way that, in a state that connector 39 of radiographic apparatus 1 and connector C arranged at a tip of cable Ca are connected to each other, radiographic apparatus 1 can be loaded to bucky apparatus 51. It is also possible to configure so that connector C is arranged in cassette holding part 51a of bucky apparatus 51, and, when radiographic apparatus 1 is loaded, connector 39 and connector C are automatically connected to each other, and the configuration may be appropriately carried out.

As it is shown in FIG. 11, in image capturing room R1, there is arranged at least one radiation source 52A, in which, radiation is irradiated, through a subject, to radiographic apparatus 1 loaded in bucky apparatus 51. In the present embodiment, it is configured so that radiation can be irradiated to either bucky apparatus 51A to image patients in an upright position or bucky apparatus 51B to image patients in a spine position by moving radiation source 52A or by changing irradiation direction of radiation.

In image capturing room R1, there is arranged repeater 54 (also referred to as a base station or the like) to relay communication or the like between each of apparatuses or the like in or out of imaging capturing room R1. In the present embodiment, to repeater 54, there is attached wireless antenna 53 (also referred to as an access point) so that radiographic apparatus 1 can perform transmitting and receiving of image data D, signals or the like in a wireless way.

Repeater 54 is connected with radiation generator 55 or console 58, and into repeater 54, there is incorporated a non-illustrated converter, which converts signals for LAN (local area network) communication or the like, which is transmitted from radiographic apparatus 1, console 58 or the like to radiation generator 55, and also carries out a reverse conversion thereof.

In front room R2 (also referred to as an operation room), in the present embodiment, there is arranged operation table 57 of radiation generator 55, and on operation table 57, there is arranged exposure switch 56 to instruct a start of irradiation of radiation to radiation generator 55 by an operation by an operator such as a radiological technologist or the like.

Radiation generator 55 is designed to carry out various controls such as moving radiation source 52 to a prescribed position, adjusting the irradiation direction, adjusting a non-illustrated aperture or collimator so that radiation is irradiated within a prescribed area of radiographic apparatus 1, or controlling radiation source 52 so that the appropriate amount of radiation is irradiated.

Further, in the present embodiment, radiation generator 55 is made so that, according to set image capturing conditions, terminates irradiation of radiation from radiation source 52 at a time when a predetermined time has elapsed from the start of irradiation of radiation.

As it is shown in FIG. 11, in the present embodiment, console 58 comprising a computer and the like is arranged in front room R2. It is also possible to configure so that console 58 is set in various locations such as image capturing room R1, the outside of front room R2, a separate room, and the like, and therefore the setting place of console 58 may be appropriately determined.

Further, console 58 is equipped with display section 58a which is constituted by being provided with a CRT (cathode ray tube), an LCD (liquid crystal display), and the like, and is also provided with a non-illustrated input unit such as a mouse and keyboard. It is also possible to configure so that display section 58 is composed of a touch panel or the like, and then a radiological technologist inputs an instruction or the like by touching display section 58a. In addition, memory section 59 composed of an HDD (hard disk drive) is connected with or incorporated in console 58.

In the present embodiment, console 58 is designed so that, as it is described below, when thinned-out data Dt are transmitted from radiographic apparatus 1, console 58 displays preview image p_pre on display section 58a based on thereof.

Further, console 58 is made in such a way that, as it is described below, when image data D or the like are transmitted from radiographic apparatus 1, console 58 generates radiation image p based on above transmitted image data D or the like.

On the other hand, radiographic apparatus 1 is configured in such a way that, without being loaded in bucky apparatus 51, it can also be used in a sort of individual state. For example, in a case where patient H is unable to stand up to go to image capturing room R1, radiographic apparatus 1 is, as it is shown in FIG. 12, brought in sickroom R3, and can be used by inserting it between bed B and the patient's body or by putting it on the patient's body.

In a case where radiographic apparatus 1 is used in such a way, for example, as it was shown in FIG. 3, if radiographic apparatus 1 is used with cable C being connected with connector 39, cable C often obstructs a work of a radiological technologist. Therefore, in the present embodiment, in a case where radiographic apparatus 1 is used in an individual state, radiographic apparatus 1 is used without cable C being connected with connector 39.

Figure 12:
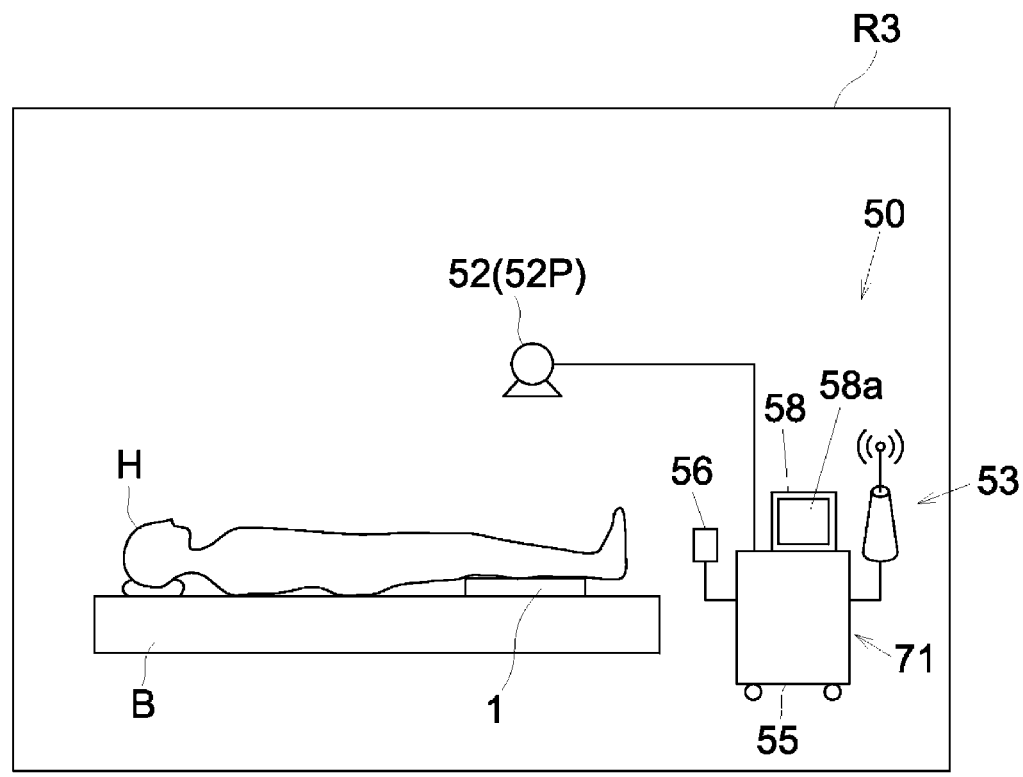
FIG. 12 is an illustration showing a configuration example of the radiographic system relating to the present embodiment constructed on a nursing cart.

Further, in a case where radiographic apparatus 1 is used in sickroom R3 or the like, since it is impossible to bring radiation generator 55 or radiation source 52A, which is fixed in aforementioned image capturing room R1, into sickroom R3, a sort of portable radiation generator 55 is brought into sickroom R3 by being carried, for example, on nursing cart 71 or the like, as it is shown in FIG. 12.

In this case, radiation 52P of portable radiation generator 55 is structured so that it irradiates radiation to an arbitrary direction. Then, radiation may be irradiated from a proper distance or direction to radiographic apparatus 1, which is inserted between bed B and a patient's body, or put on the patient's body.

As it was shown in FIG. 11, it is also possible that radiographic apparatus 1 is inserted between the patient's body, which is laid down on bucky apparatus 51B to image patients in a spine position placed in image capturing room R1, and bucky apparatus 51B to image patients in a spine position, or put on the patient's body on bucky apparatus 51B to image patients in a spine position. In this case, either portable radiation 52P or radiation source 52A installed in image capturing room R1 may be used.

In a case of radiographic system 50 built on nursing cart 71 shown in FIG. 12, it is also possible to construct the system in such a way that console 58 carries out up to display processing of preview image p_pre on display section 58b, which is described below, and, regarding creation or the like of final radiation image p, image data D or the like, which were received by and kept in the aforesaid console 58, are transferred to another console having functions of creation processing, and then the creation is carried out at the aforesaid another console.

[Processing Up to Read-Out Processing of Image Data D in Radiographic Apparatus]

In the following paragraphs, there is described processing in radiographic apparatus 1 or radiation generator 55 up to processing in which, in radiographic system 50, radiation is irradiated to radiographic apparatus 1, and image data D are read out from each radiation detection element 7.

[Cooperation Method]

As it was shown in FIG. 11, in a case where radiographic system 50 is structured in image capturing room R1 or the like, signal exchanges are carried out between radiographic apparatus 1 and radiation generator 55 through repeater 54 or console 58, and then radiation image capturing can be carried out while radiographic apparatus 1 is cooperating with radiation generator 55. Hereinafter, such an image capturing method is referred to as a cooperation method.

[Processing in a Case of Cooperation Method]

In the present embodiment, in a case where radiation image capturing is carried out in a cooperation method, controller 22 of radiographic apparatus 1 is made so that it first carries out reset processing of each radiation detection element 7 prior to radiation image capturing. In the reset processing of each radiation detection element 7, each processing shown in FIG. 9 is carried out for each of lines L1 to Lx of scanning line 5.

Figure 13:
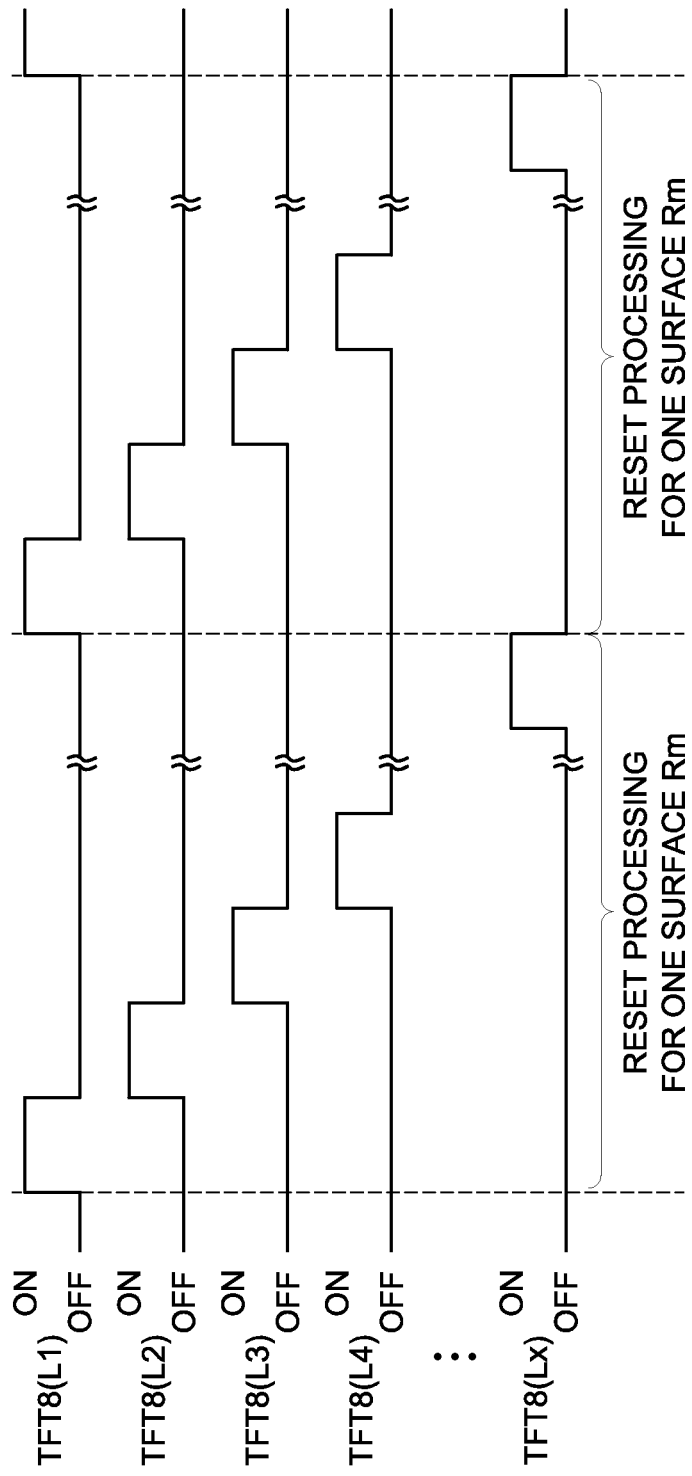
FIG. 13 is a timing chart in a reset processing for one surface.

Specifically, for example as it is shown in FIG. 13, controller 22 of radiographic apparatus 1 successively applies an ON voltage from gate driver 15b (refer to FIG. 7) of scanning driving section 15 to each of lines L1 to Lx of scanning line 5, and successively applies an ON voltage to gate electrode 8g of each TFT 8 to make TFT 8 an ON condition, to release charges remaining in each radiation detection element 7 to each signal line 6.

In such a way, controller 22 repeats reset processing for one surface Rm, which is carried out by successively applying an ON voltage from first line L1 to final line Lx of scanning line 5.

Figure 14:
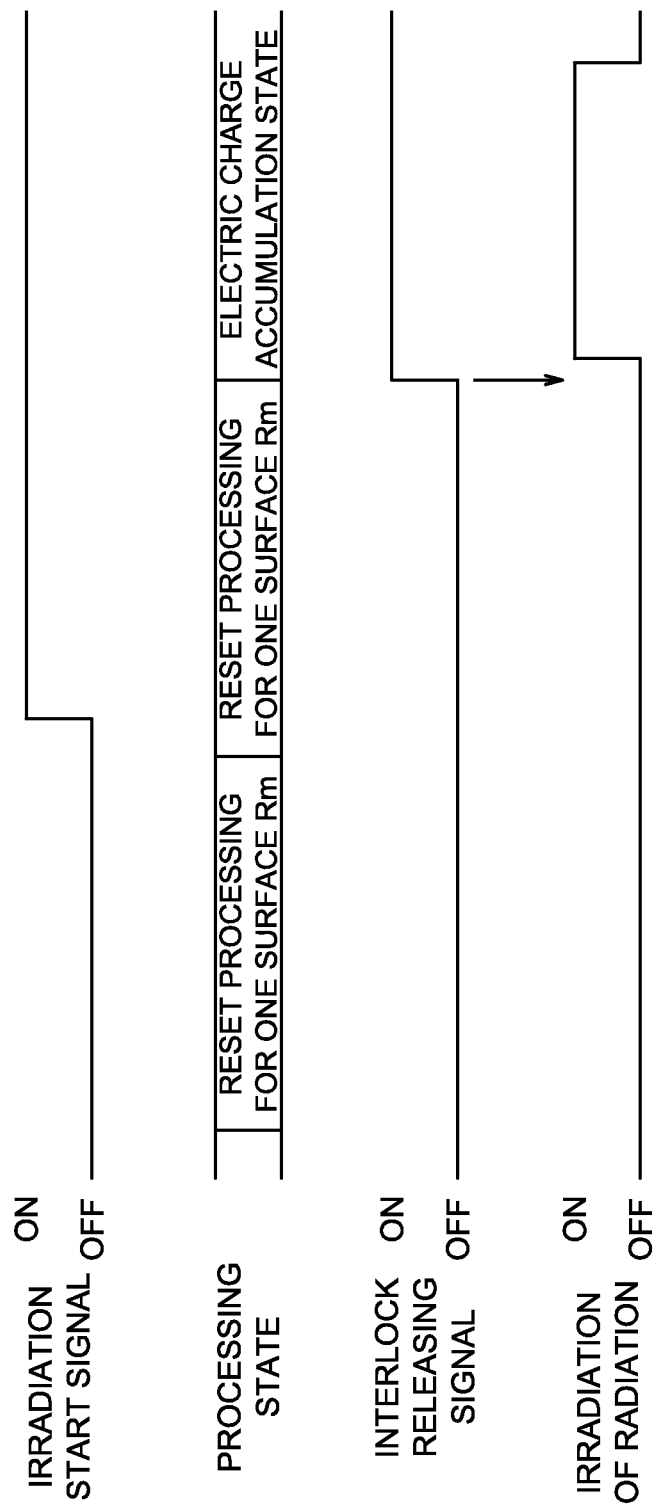
FIG. 14 is a timing chart showing a timing of a transmission of an irradiation start signal in a cooperation method, a completion of reset processing and a transition to an electric charge accumulation state, a transmission of an interlock releasing signal, and an irradiation of radiation.

Then, for example, as it is shown in FIG. 14, during reset processing for one surface Rm, when an irradiation start signal is transmitted from radiation generator 55 to radiographic apparatus 1 by exposure switch 56 (refer to FIG. 11 or FIG. 12) being operated at radiation generator 55 by a radiological technologist, controller 22 of radiographic apparatus 1 terminates reset processing of each radiation detection element 7 at a time when reset processing for one surface Rm, which has been carried out at a time when an irradiation start signal is transmitted, is completed.

Then, controller 22 allows scanning driving section 15 to apply an OFF voltage to all lines L1 to Lx of scanning line 5 to make all TFT 8 an OFF state, and transfer the system to electric charge accumulation state in which charges generated in each radiation detection element 7 by irradiation of radiation are accumulated in each radiation detection element 7.

Controller 22, simultaneously with the above, transmits an interlock release signal to radiation generator 55 at a time when reset processing for one surface Rm was completed as described above. Radiation generator 55 irradiates radiation from radiation source 52, when radiation generator 55 receives the interlock release signal from radiographic apparatus 1 through repeater 54.

In the cooperation method, it is designed in such a way that radiation is irradiated to radiographic apparatus 1, while exchanging an irradiation start signal or an interlock release signal between radiographic apparatus 1 and radiation generator 55.

Further, controller 22 of radiographic apparatus 1, when transmits an interlock release signal as it was described above, maintains the electric charge accumulation state during a prescribed time period. Then, after the prescribed time period has passed, controller 22 applies an ON voltage to each of lines L1 to Lx of scanning line 5, and then, reads out each of image data D from radiation detection element 7. The area filled with oblique lines in FIG. 15 indicates that radiation was irradiated during the period.

In this case, it is also possible to configure so that, at a time when irradiation of radiation from radiation source 52 is finished, a termination signal is transmitted from radiation generator 55 to radiographic apparatus 1, and radiographic apparatus 1, immediately after receiving the termination signal, moves from the electric charge accumulation state to read-out processing of image data D.

[Non-Cooperation Method]

Further, as it was shown in FIG. 12, there is a case where an exchange of signals between radiographic apparatus 1 and radiation generator 55 can not be performed like a case where radiographic system 50 is structured on nursing cart 71. Hereinafter, in this way, an image capturing method, in which image capturing is carried out without exchanging signals between radiographic apparatus 1 and radiation generator 55, is referred to as a non-cooperation method.

In the present embodiment, radiographic apparatus 1 is designed so that it can perform a radiation image capturing in either cooperation method or non-cooperation method depending on the situation, but the present invention can also be applied to a radiographic apparatus in which radiation image capturing can be carried out only by either the cooperation method or the non-cooperation method.

[Processing in a Case of Non-Cooperation Method]

In the present embodiment, radiographic apparatus 1 detects, in this non-cooperation method, by radiographic apparatus 1 itself that radiation was irradiated. Hereinafter, two detection methods, as the method for detecting a start of irradiation of radiation, are described as examples.

[Detection Method 1]

Figure 16:
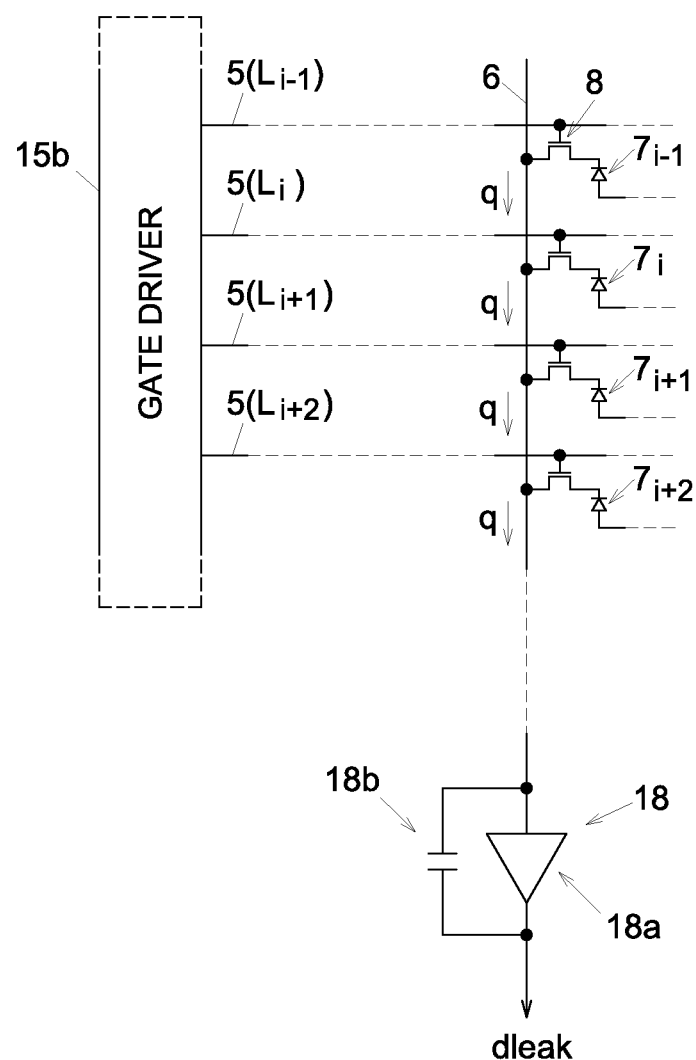
FIG. 16 is a figure describing that each of charges leaked from each radiation detection element through a TFT is read out as leak data.

For example, it is also possible to configure so that read-out processing of leak data d leak is repeated prior to radiation image capturing, that is, prior to radiation being irradiated to radiographic apparatus 1. Leak data d leak means data, as it is shown in FIG. 16, equivalent to the total value of each signal line 6 of charges q leaked from each radiation detection element 7 through each TFT 8 being in an OFF state, in a state that an OFF voltage is applied to each scanning line 5.

Figure 17:
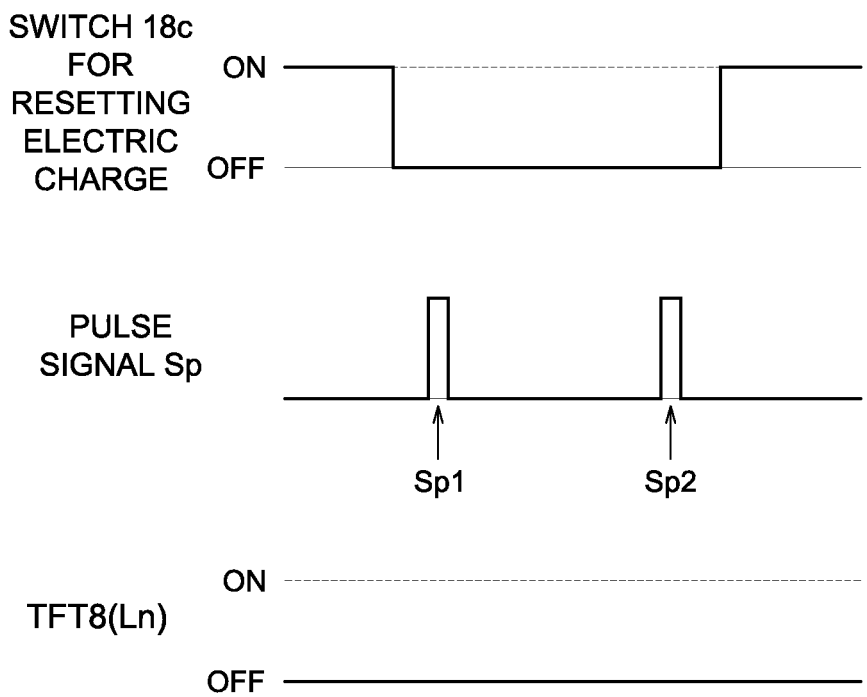
FIG. 17 is a timing chart showing a switch for resetting electric charge in a read-out processing of leak data, and ON and OFF timing for TFT.

Then, in the read-out processing of leak data d leak, unlike the case of read-out processing of image data D which was shown in FIG. 10, as it is shown in FIG. 17, read-out circuit 17 is made to perform read-out processing in a state that each TFT 8 is made an OFF state by applying an OFF voltage to each of lines L1 to Lx of scanning line 5.

Specifically, as it is shown in FIG. 17, in a state that each TFT 8 is made an OFF state by applying an OFF voltage to each of lines L1 to Lx of scanning line 5, pulse signals Sp1 and Sp2 are transmitted from controller 22 to correlated double sampling circuit 19 (refer to CDS in FIG. 7 or in FIG. 8) of each read-out circuit 17. Correlated double sampling circuit 19, when pulse signal Sp1 is transmitted from controller 22, holds voltage value Vin which has been output from amplifying circuit 18 at that point.

Then, when charges q leaked from each radiation detection element 7 are accumulated, through each TFT 8, in condenser 18b of amplifying circuit 18 to increase a voltage value output from amplifying circuit 18, and thereby, pulse signal Sp2 is transmitted from controller 22, correlated double sampling circuit 19 holds voltage value Vfi which has been output from amplifying circuit 18 at that point.

An out-put value of difference Vfi-Vin of a voltage value calculated by correlated double sampling circuit 19 is equivalent to leak data d leak. The following conversion of leak data d leak into a digital value by A/D converter 20 is similar to the aforesaid case of read-out processing of image data D. In such a way, read-out processing of leak data d leak can be carried out.

However, if it is structured so that only read-out processing of leak data d leak is repeated, each TFT8 is kept in an OFF state, and thereby the system becomes a state that dark charges generated in each radiation detection element 7 continue to be accumulated in each radiation detection element 7.

Figure 18:
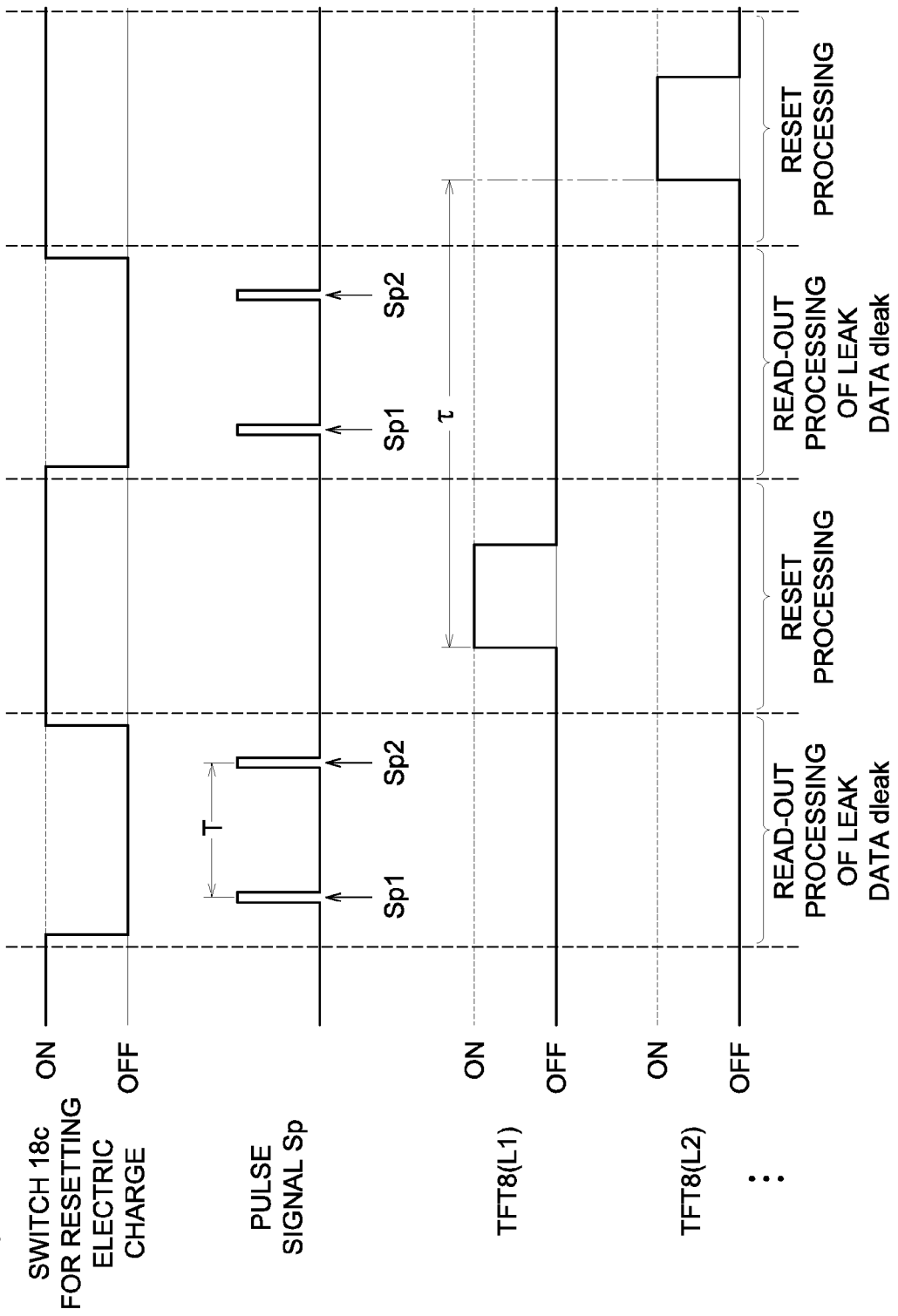
FIG. 18 is a timing chart showing a switch for resetting electric charge, pulse signals, and ON and OFF timing for TFT in a case where a constitution is made so that read-out processing of leak data and reset processing of each radiation detection element are alternately carried out prior to capturing a radiation image.

Therefore, in this detection method 1, as it is shown in FIG. 18, it is desirable that the system is constituted so that read-out processing of leak data d leak, which is performed in a state that an OFF voltage is applied to each scanning line 5, and reset processing of each radiation detection element 7 with an ON voltage being successively applied to each of lines L1 to Lx of scanning line 5 are alternately repeated. The T and τ used in FIGS. 18 and 19 are described below.

As described above, in a case where the system is constituted in such a way that, prior to radiation image capturing, read-out processing of leak data d leak and reset processing of each radiation detection element 7 are alternately repeated, when irradiation of radiation from above described radiation source 52 (refer to FIG. 11 or FIG. 12) to radiographic apparatus 1 is started, electromagnetic waves, converted from the radiation at scintillator 3, are irradiated to each TFT 8.

When electromagnetic waves are irradiated to each TFT 8 in this way, each charge q (refer to FIG. 8) leaked from each radiation detection element 7 through each TFT 8 increases due to the irradiation. As a result, as it is shown in, for example, FIG. 19, in a case where read-out processing of leak data d leak and reset processing of each radiation detection element 7 are alternately repeated prior to radiation image capturing, leak data d leak, which were read out at a time when irradiation of radiation to radiographic apparatus 1 is started, becomes a significantly larger value than values of leak data d leak which were read out before that point, as it is shown in FIG. 20.

Figure 19:
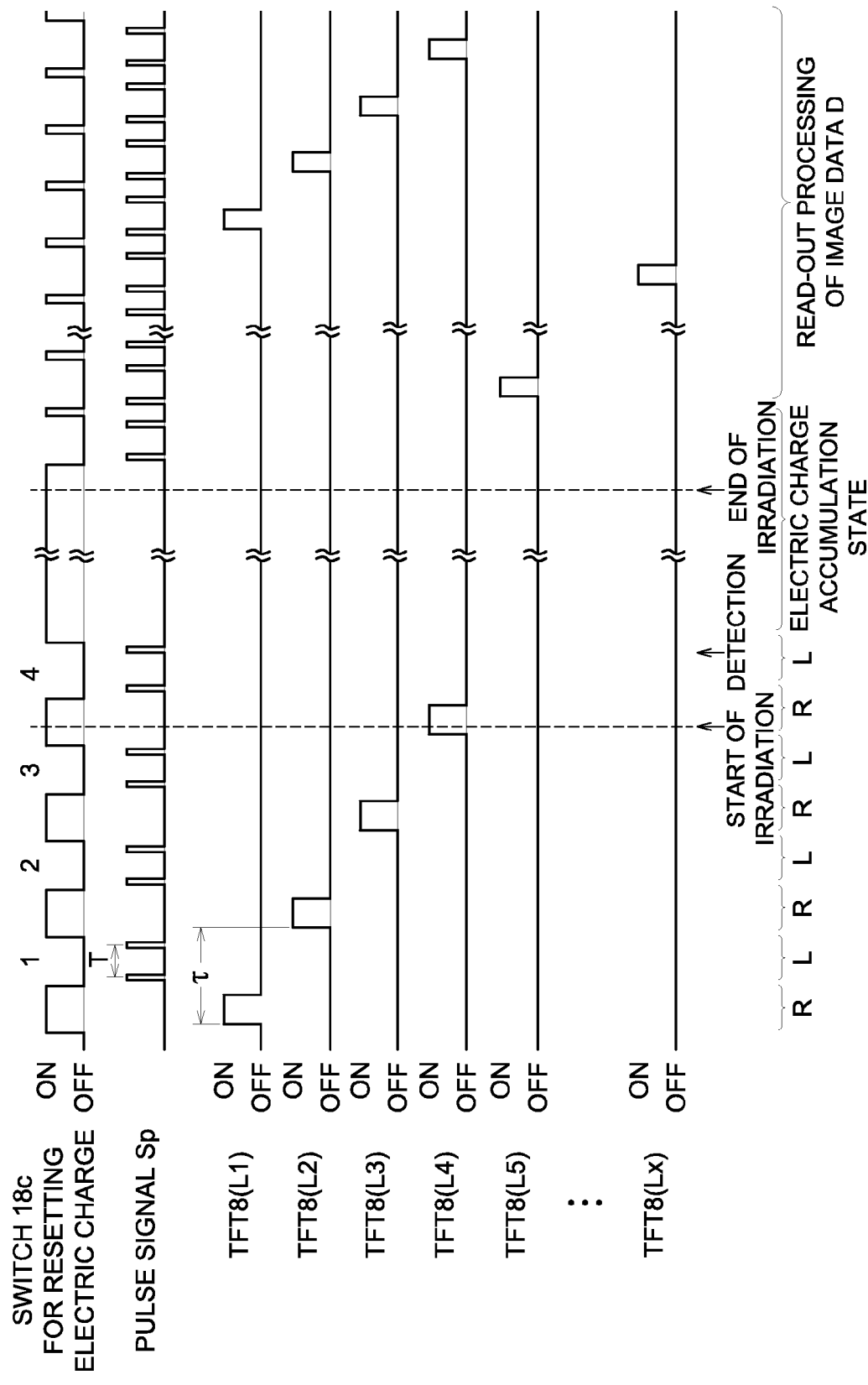
FIG. 19 is a timing chart showing timing and the like of application of an ON voltage to each scanning line in detection method 1.
Figure 20:
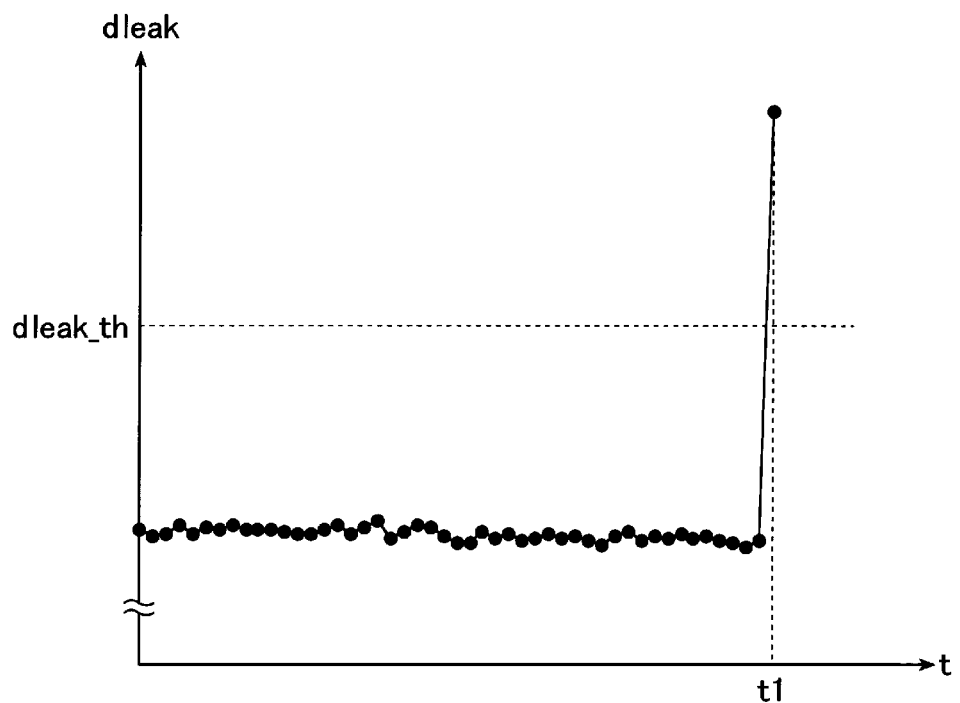
FIG. 20 is a graph in which read-out leak data are plotted in a chronological order.

Leak data d leak, which was read out at the fourth read-out processing after a reset processing was performed by an ON voltage being applied to line L4 of scanning line 5 in FIG. 19, correspond to leak data d leak at time t1 in FIG. 20. In FIG. 19, the letters R and L represent reset processing of each radiation detection element 7, and read-out processing of leak data d leak, respectively.

Therefore, it is possible to constitute so that leak data d leak, which was read out at read-out processing of leak data d leak prior to radiation image capturing, is watched by controller 22 of radiographic apparatus 1, and a start of irradiation of radiation is detected at a time when read-out leak data d leak exceeds, for example, predetermined prescribed threshold valued leak_th (refer to FIG. 20).

[Detection Method 2]

Figure 21:
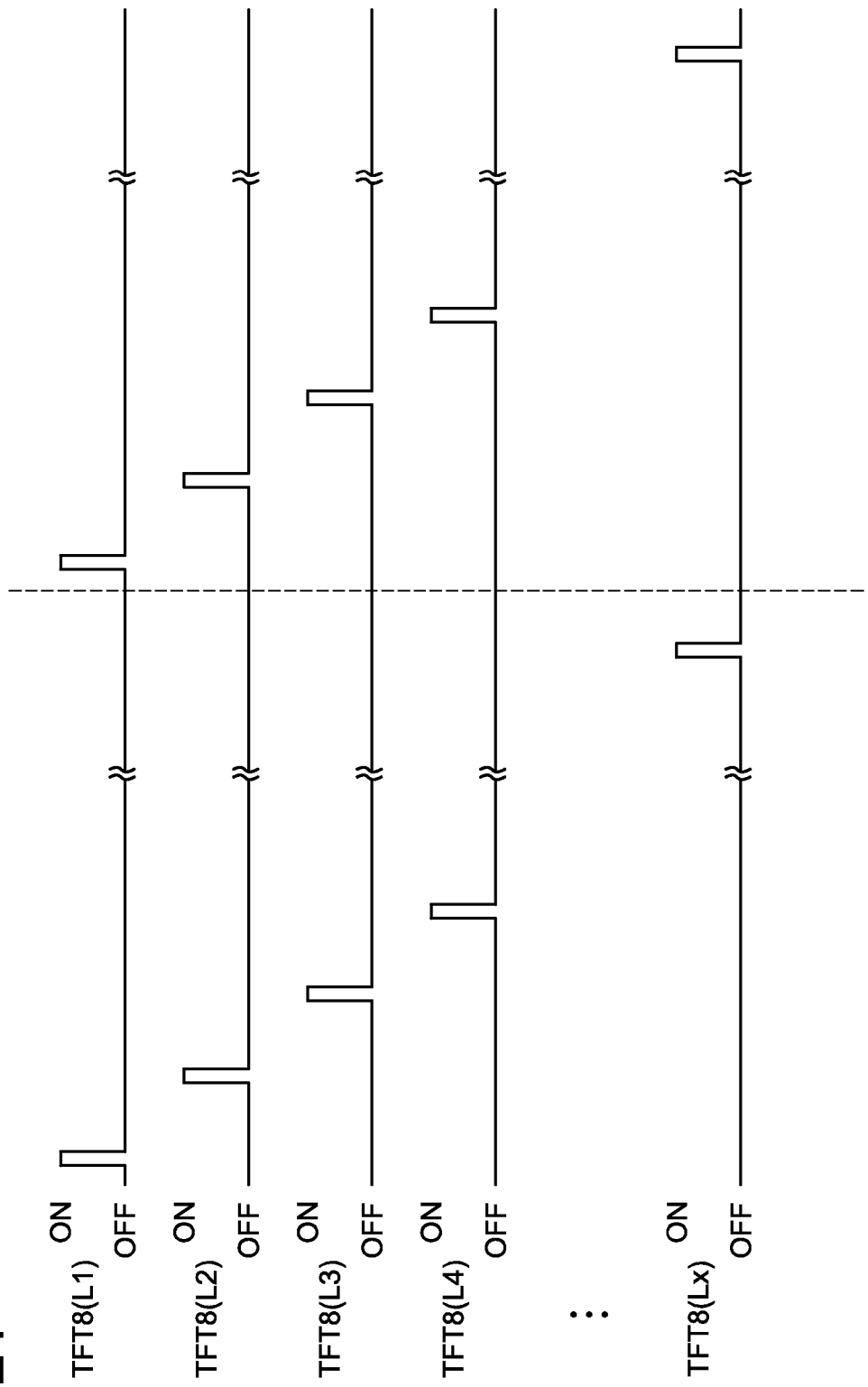
FIG. 21 is a timing chart showing a timing of successive application of an ON voltage to each scanning line when read-out processing of image data used for detection of a start of irradiation is repeatedly carried out in detection method 2.

Instead of the constitution that read-out processing of leak data d leak is performed prior to radiation image capturing like the above detection method 1, it is also possible to constitute so that, prior to radiation image capturing, as it is shown in FIG. 21, read-out processing of image data d for detection of a start of irradiation from each radiation detection element 7 is performed by successively applying an ON voltage from gate driver 15b of scanning driving section 15 to each of lines L1 to Lx of scanning line 5.

Figure 22:
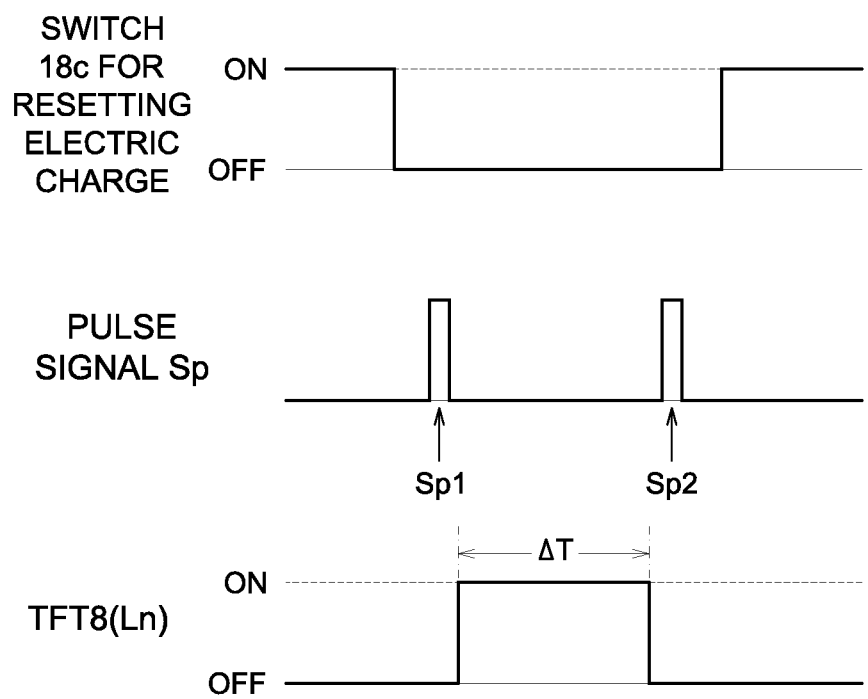
FIG. 22 is a timing chart showing a switch for resetting electric charge, pulse signals, ON and OFF timing for TFT, and ON time ΔT in read-out processing of image data used for detection of a start of irradiation.

In this case, an ON and OFF action of switch 18c for resetting electric charge of amplifying circuit 18 of read-out circuit 17 in read-out processing of image data d for detection of a start of irradiation, or transmission of pulse signals Sp1 and Sp2 to correlated double sampling circuit 19 are, as it is shown in FIG. 22, performed in a similar way to the processing (refer to FIG. 10) in read-out processing of image data D. The ΔT in FIG. 22 or the like is described later.

Figure 23:
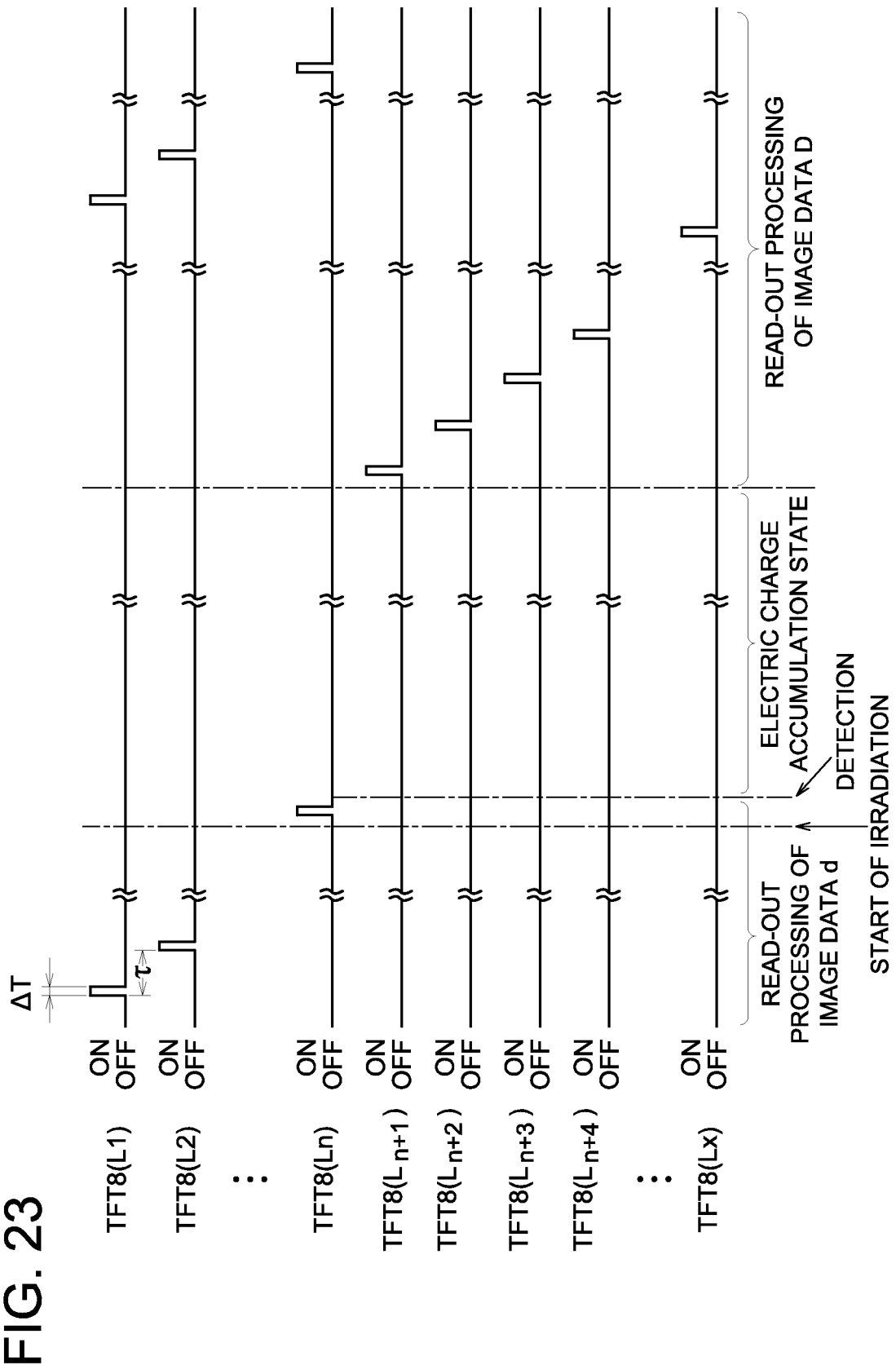
FIG. 23 is a timing chart showing timing and the like of application of an ON voltage to each scanning line in detection method 2.

In a case where the system is structured in such a way that, as it was described above, read-out processing of image data d is performed prior to radiation image capturing, when, as it is shown in FIG. 23, irradiation of radiation to radiographic apparatus 1 is started, image data "d" (in FIG. 23, image data d which was read out by an ON voltage being applied to line Ln of scanning line 5), which was read out at that point, becomes a significantly larger value than image data d which were read out before that point, similarly to the case of leak data d leak shown in the foregoing FIG. 20.

Therefore, it is possible to constitute so that image data "d", which was read out at read-out processing prior to radiation image capturing, is watched by controller 22 of radiographic apparatus 1, and a start of irradiation of radiation is detected at a time when read-out image data d exceeds predetermined prescribed threshold value d th.

In above detection method 1 or 2, in order to increase the read-out sensitivity of leak data d leak or image data "d", it is also possible to constitute so as to lengthen a cycler of read-out processing of leak data d leak or of image data "d" (refer to FIG. 18, FIG. 19 or FIG. 23), transmission interval T of pulse signals Sp1 and Sp2 (refer to FIG. 18 or FIG. 19), or time period ΔT of applying an ON voltage to TFT 8 (refer to FIG. 22 or FIG. 23).

Also in the case of above detection method 1 or 2, it is designed so that, as it is shown in FIG. 19 or FIG. 23, controller 22 of radiographic apparatus 1, when it detects that irradiation of radiation is started in the above way, terminates application of an ON voltage to scanning line 5 at that point, and then, applies an OFF voltage from gate driver 15b to each of lines L1 to Lx of scanning line 5 to make each TFT 8 an OFF state, and then, moves the system to charge accumulation state in which charges generated in each radiation detection element 7 by irradiation of radiation are accumulated in each radiation detection element 7.

It is designed so that, after a prescribed time period has passed since the start of irradiation of radiation is detected and the irradiation of radiation is terminated, controller 22, in a case, for example, of detection method 1, starts application of an ON voltage starting from scanning line 5 (in the case of FIG. 19, line L5 of scanning line 5), to which an ON voltage has to be applied, next to scanning line 5 (in the case of FIG. 19, line L4 of scanning line 5), to which an ON voltage was applied at the reset processing immediately before a time point at which irradiation of radiation was started by read-out processing of leak data d prior to radiation image capturing, and then successively applies an ON voltage to each scanning line 5 to perform read-out processing of image data D as the main image.

The case of detection method 2 is similar to the above, but it is also possible to structure the system in such a way that read-out processing of image data D is performed so that an ON voltage is applied from the first line L1 of scanning line 5, and then an ON voltage is successively applied to each scanning line 5.

[Case of Image Capturing in the Presence of Radiological Technologist]

In a case of a non-cooperation method where radiographic apparatus 1 can not or does not exchange signals with radiation generator 55, there is a constitution in which radiographic apparatus 1 itself detects a start of irradiation of radiation as described above, but there is also a constitution in which radiation image capturing is carried out in the presence of a radiological technologist.

In this case, for example, the system is constituted so that the radiation image capturing is carried out in the following way.

Namely, for example, radiographic apparatus 1 performs reset processing of each radiation detection element 7, which is shown in FIG. 13, prior to radiation image capturing, that is, performs only the predetermined prescribed number of times of reset processing for one surface Rm. Then, radiographic apparatus 1 applies an OFF voltage from gate driver 15b to each of lines L1 to Lx to make each TFT 8 an OFF state, and thereby allows the system to move to an electric charge accumulation state in which charges generated in each radiation detection element 7 by irradiation of radiation are accumulated in each radiation detection element 7.

In such a way, at a time when the system became a state in which irradiation of radiation from radiation source 52 (refer to FIG. 11 or FIG. 12) is permitted, the radiological technologist is informed that the system became a state in which irradiation of radiation from radiation source 52 is permitted by, for example, lighting up a specific color in indicator 40 (refer to FIG. 1). In this case, indicator 40 functions as an informing unit to indicate that the system became a state in which irradiation of radiation from radiation source 52 is permitted.

When the radiological technologist confirms that the predetermined color is lit up in indicator 40 or other indicator becomes ON, which is an informing unit, irradiates radiation from radiation source 52 by operating exposure switch 56 (refer to FIG. 11 or FIG. 12) of radiation generator 55.

In this case, the irradiation time period of radiation from radiation source 52 is extremely short, and it is not sure by radiographic apparatus 1 itself that the radiation is irradiated in which timing. Therefore, it is constituted so that an electric charge accumulation state continues for a relatively long period, for example, 10 seconds so that an electric charge accumulation state continues from the start until the end of irradiation of radiation.

Figure 15:
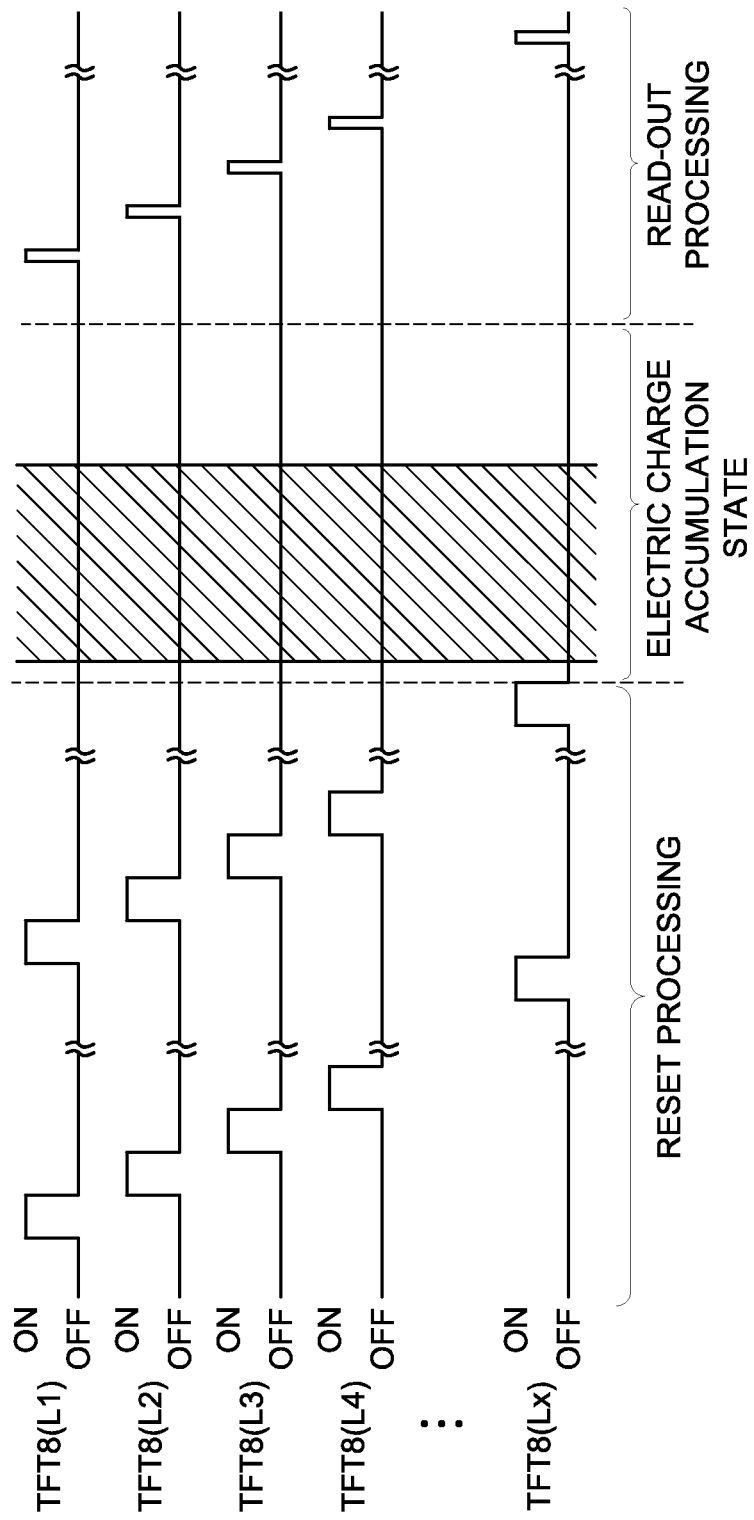
FIG. 15 is a timing chart showing a timing of successive application of an ON voltage to each scanning line in a cooperation method.

In the similar way to the case shown in FIG. 15, controller 22 of radiographic apparatus 1 is constituted in such a way as described above that, after an electric charge accumulation state continued for the prescribed time period, controller 22 successively applies an ON voltage to each of lines L1 to Lx of scanning line 5 to read out each of image data D from each radiation detection element 7. Hereinafter, the image capturing method in which image capturing is carried out in such a way in the presence of the radiological technologist is simply referred to as a method in the presence of a radiological technologist.

The present invention can be applied not only to the case of the above cooperation method but also to the case of, in the non-cooperation method, detecting the start of irradiation of radiation by radiographic apparatus 1 itself (refer to above detection methods 1 and 2) or the method in the presence of a radiological technologist.

Further, it may be constituted so that the reset processing of each radiation detection element 7 prior to radiation image capturing in the above cooperation method or method in the presence of a radiological technologist, or the read-out processing of leak data d leak in detection method 1 of the non-cooperation method (and the reset processing of each radiation detection element 7) or read-out processing of image data "d" for detection of a start of irradiation in detection method 2 of the non-cooperation method is performed immediately after power activation of radiographic apparatus 1. Further, it is also possible to constitute so that the above processing is started with a start operation of radiographic apparatus 1 by a radiological technologist or other persons, or transmission of a start signal from console 58 as a trigger.

[Each Processing after Read-Out Processing of Image Data D]

[Transmission of Thinned-Out Data]

Figure 24:
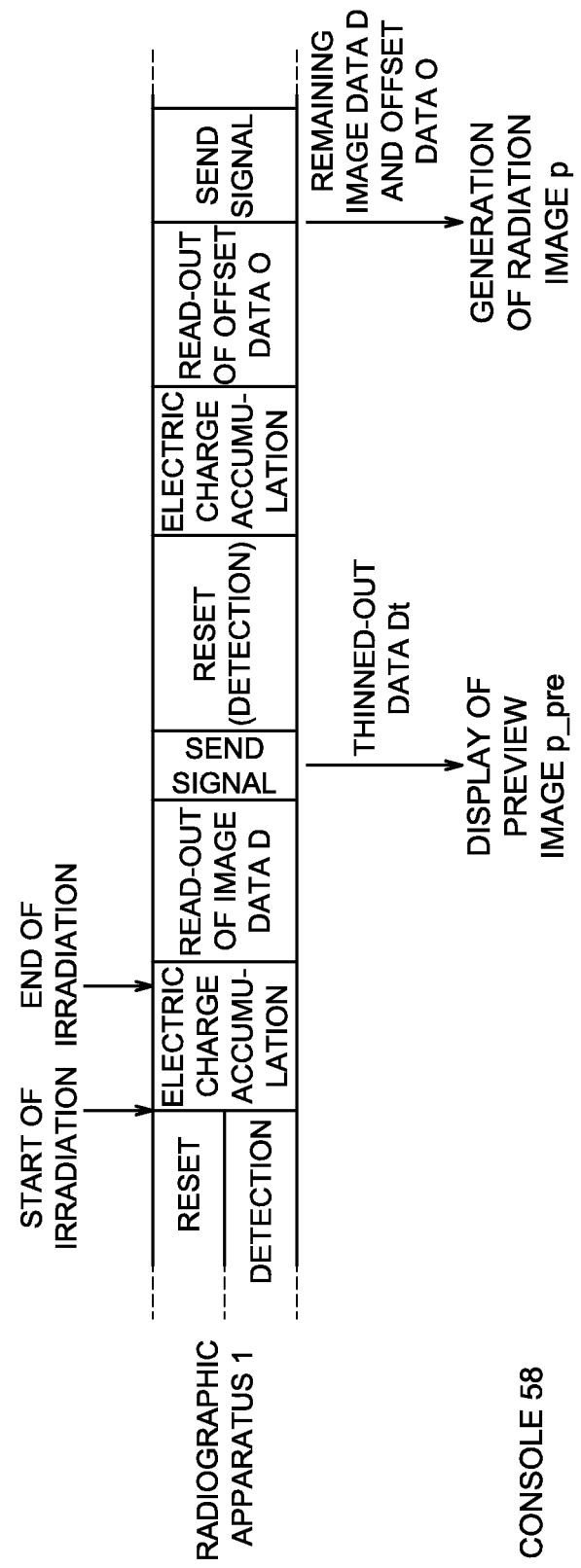
FIG. 24 is a figure showing a series of processing flow in the radiographic apparatus and console in a case where a preview image was approved.

In either above cooperation method or non-cooperation method (including a method in the presence of a radiological technologist), when read-out processing of image data D as a main image is completed in the above way, controller 22 of radiographic apparatus 1 is made, in the present embodiment as it is shown in FIG. 24, to transmit thinned-out data Dt, in which data were thinned out at a prescribed rate from read-out image data D, to console 58.

Namely, as it is shown in, for example, FIG. 25, when image data D, which were read out from radiation detection element 7 (n, m) in the n-th row and m-th column of detection section P (refer to FIG. 4 or FIG. 7), is represented as D (n, m), controller 22 of radiographic apparatus 1, among read-out image data D (n, m), extracts image data D (n, m), which were read out from each radiation detection element 7 being connected with scanning line 5 which was designated at a rate of one line out of the predetermined numbers (four lines in the case of FIG. 25) of each of lines L1 to Lx of scanning line 5, as shown by, for example, oblique lines in the figure, and then, above extracted image data D (n, m) are represented as thinned out data Dt.

Then, controller 22 is made to transmit thinned-out data Dt, extracted in this way, to console 58 as data used for a preview image data. When thinned-out data Dt, image data D or the like are transmitted to console 58, thinned-out data Dt or the like are compressed and transmitted, as described below.

[Generation and Display of Preview Image]

Further, console 58 is configured in such a way that, when thinned-out data Dt is transmitted from radiographic apparatus 1 in the way described above, console 58 restores the original thinned-out data Dt by adequately expanding the compressed data in a case where thinned-out data Dt is compressed, after which console 58 generates preview image p_pre based on the restored data, and then displays the generated preview image p_pre on display section 58a.

As it is described below, the offset equivalent data originated in dark charges are superimposed on thinned-out data Dt. Therefore, to generate preview image p_pre, it is required to reduce the offset equivalent data from thinned-out data Dt, but, as it is shown in FIG. 24, at a time when thinned-out data Dt were transmitted to console 58, offset data O in the aforesaid image capturing, which are equivalent to the above offset data, have not been transmitted to console 58.

Therefore, it is possible to constitute so that, as it is described in, for example Japanese Patent Application Publication No. 2002-330429, offset data O obtained at the preceding image capturing are used as the above offset equivalent data which is subtracted from thinned-out data Dt. Further, for example, it is also possible to constitute so that the offset equivalent data for generation of preview image p_pre are prepared in console 58 for each radiation detection element 7.

It is designed so that, in the generation processing of preview image p_pre, console 58 carries out a simple processing such as a conversion of a value, in which offset equivalent data were subtracted from thinned-out data Dt, into the logarithm scale, after which rapidly displays the generated preview image p_pre on display section 58a.

[Read-Out Processing of Offset Data]

In a case where a radiological technologist who observed the displayed preview image p_pre determined that an image of a subject was properly captured in an image, and a re-image capturing was unnecessary, and then, performed, through an input unit, an operation of approving the aforesaid preview image p_pre to console 58 (or in a case where an operation of rejecting preview image p_pre was not performed by a radiological technologist within a prescribed time since preview image p_pre was displayed; hereinafter the same), radiographic apparatus 1 is made so as to subsequently pet form read-out processing of offset data O as it is shown in FIG. 24.

Figure 26:
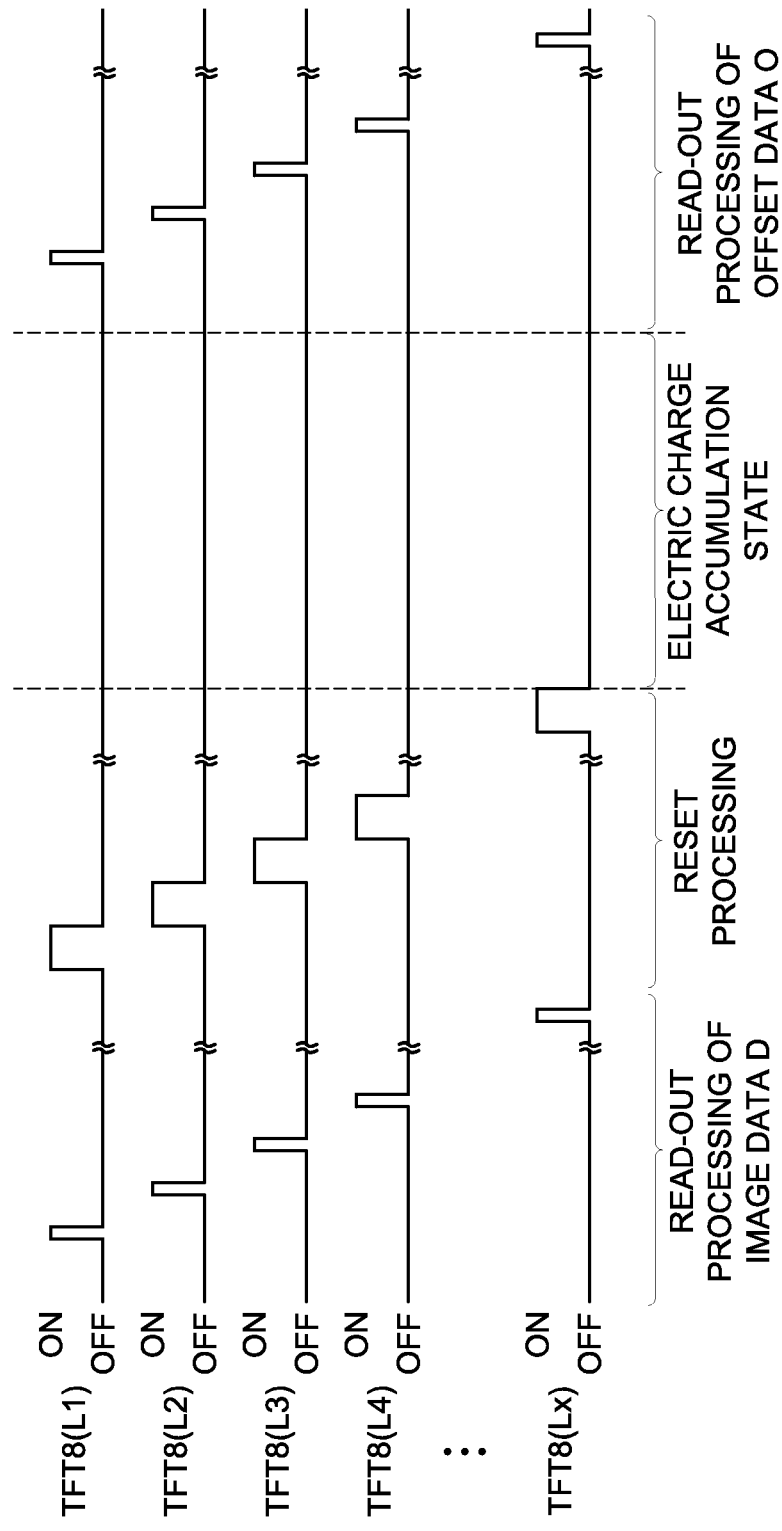
FIG. 26 is a timing chart describing that read-out processing of offset data is carried out by repeating a series of processing sequence to read-out processing of image data.

This read-out processing of offset data O is one which reads out, as offset data O for each radiation detection element 7, the offset equivalent data originated in dark charges superimposed on image data D. In a case, for example, of the above cooperation method, after read-out processing of image data D, as it is shown in FIG. 26, the read-out processing of offset data O preferably repeats the same processing sequence as one until read-out processing of image data D, which is shown in FIG. 15.

Namely, it is desirable that read-out processing of offset data O is performed with the same processing sequence as one from reset processing prior to radiation image capturing until, through transition to an electric charge accumulation state, read-out processing of image data D (namely, application of an ON voltage from gate driver 15b to each scanning line 5, read-out action at each read-out circuit 17, or the like).

In this case, since it is the read-out processing of only data originated in dark charges as it is described above, read-out processing of offset data O is performed in a state that no radiation is irradiated to radiographic apparatus 1.

Similarly to the case where the above detection method 1 or 2 is adopted in the above non-operation method, read-out processing of offset data D is preferably carried out by repeating the same processing sequence as one until read-out processing of image data D which were shown in FIG. 19 or FIG. 23. Further, similarly, also in the method in the presence of a radiological technologist in the above non-cooperation method, the same sequence as one until read-out processing of image data D is preferably repeated.

If the offset equivalent data originated in dark charges superimposed on image data D and offset data O have the same time period from TFT 8 being made an OFF state prior to transition to an electric charge accumulation state until an ON voltage being applied to TFT 8 in read-out processing of image data D or offset data O (hereinafter referred to as "the effective accumulation time"), the same values are read-out.

When the effective accumulation time is changed, the offset equivalent data or offset data O vary depending on the effective accumulation time. According to the inventor's study, it has been found that, at that time, the size of offset equivalent data or offset data O and the effective accumulation time do not always have a linear relationship.

However, as it is described above, if read-out processing of offset data O is constituted so that the same sequence as one until read-out processing of image data D is repeated, the effective accumulation time in the read-out processing of image data D becomes equal to the effective accumulation time in the read-out processing of offset data O for each of lines L1 to Lx of scanning line 5.

Therefore, offset equivalent data originated in dark charges superimposed on image data D and offset data O have an identical value. Therefore, if it is constituted so that offset data O is subtracted from image data D by the subsequent image processing, offset equivalent data originated in dark charges superimposed on image data D and offset data O are appropriately offset from each other, and then, it becomes possible to calculate true image data D* originated from only charges generated in each radiation detection element 7 by irradiation of radiation. Therefore, the above constitution is preferable.

In a case where the above detection method 1 of the non-cooperation method is adopted, it is also possible to constitute in such a way that, after read-out processing of image data D, and prior to read-out processing of offset data O, only reset processing of each radiation detection element 7 is performed without performing read-out processing of leak data d leak.

Further, in a case where the above detection method 2 of the non-cooperation method is adopted, it is also possible to constitute in such a way that, after read-out processing of image data D, and prior to read-out processing of offset data O, reset processing of each radiation detection element 7 is performed in place of read-out processing of image data d for detection of a start of irradiation.

The reason for that is that, in the read-out processing of offset data O, no radiation is irradiated as it is described above, and it is not necessary to detect a start of irradiation of radiation.

On the other hand, even in a case of the above constitution, in a case where only reset processing of each radiation detection element 7 is performed (a case of detection method 1), or in a case where reset processing of each radiation detection element 7 in place of read-out processing of image data "d" for detection of a start of irradiation is performed (a case of detection method 2), it is desirable to be constituted so that an ON voltage is applied to each of lines L1 to Lx of scanning line 5 at same cycle as one (refer to FIG. 19 or FIG. 23) prior to read-out processing of image data D.

The reason for that is that, if it is constituted in such a way, for each of lines L1 to Lx of scanning line 5, the effective accumulation time at a time of the read-out processing of image data D becomes equal to the effective accumulation time at a time of the read-out processing of offset data O.

[Transmission of Remaining Image Data or the Like, and Generation of Radiation Image]

In the present embodiment, when the read-out processing of above offset data O is finished, controller 22 of radiographic apparatus 1 transmits, as it is shown in FIG. 24, remaining image data D except for above thinned-out data Dt and offset data O to console 58.

Console 58, when remaining image data D and offset data O are transmitted from radiographic apparatus 1, calculates true image data D* by subtracting offset data O from image data D for each radiation detection element 7 as described above. Then, with regard to calculated true image data D*, console 58 performs image processing such as a gain correction, an offset correction, a defect image correction, and gradation processing corresponding to image capturing parts, to generate final radiation image p.

Console 58 is made to keeps radiation image p, after generation thereof, in memory section 59. Further, generated radiation image p is suitably subjected to processing such as being displayed on display section 58a if needed, or being transferred to an image display apparatus in or out of the system or to other system.

[Processing in Case of Preview Image Having been Rejected]

In the meantime, each above processing is performed in a case where, as it is described above, a radiological technologist, who observed preview image p_pre, which was displayed on display section 58a of console 58, decided that image re-capturing was unnecessary, and thereby carried out an operation to approve the aforesaid preview image p_pre.

In this way, in the present embodiment, in the case where a radiological technologist, who observed preview image p_pre, decided that image re-capturing was unnecessary (namely, a radiological technologist carried out an operation to approve the aforesaid preview image p_pre, or the like action), it is designed so that, as it is shown in FIG. 24, each processing, such as read-out processing of above offset data O or transmission of remaining image data D, or the like in radiographic apparatus 1, or generation processing of radiation image p based on image data D in console 58, is automatically performed.

On the other hand, in a case where a subject was not exposed in preview image p_pre for some reasons, or a subject was not exposed in an appropriate position of an image, the radiological technologist decides that image re-capturing is necessary.

However, as it was described above, there will occur inconvenience to a radiological technologist that, even in such a case, if it is constituted so that, as it is described above, after the transmission of thinned out data Dt, read-out processing of offset data O, transmission of remaining image data D, or the like are automatically performed, the radiological technologist is unable to carry out image re-capturing until the above series of processing (specifically, transmission processing of remaining image data D written at the right end of FIG. 24, or the like), are finished.

Namely, for example, in a case where an image capturing is carried out in the above described method in the presence of a radiological technologist, as it was described above, since it is not sure by radiographic apparatus 1 itself that the radiation is irradiated in which timing, it is constituted so that an electric charge accumulation state continues for a relatively long period, for example, 10 seconds. Then, as it is described above, if read-out processing of offset data O is constituted so that the same processing sequence as one until read-out processing of image data D is repeated, an electric charge accumulation state in read-out processing of offset data O also continues for a relatively long period, for example, 10 seconds.

As a result, if it is constituted so that, as it is described above, after the transmission of thinned out data Dt, a series of processing such as read-out processing of offset data O are automatically performed, even if a radiological technologist rejects preview image p_pre, the radiological technologist is unable to carry out image re-capturing for at least 10 seconds after the denial, which causes a problem that the radiographic system becomes difficult to use for the radiological technologist.

Therefore, radiographic apparatus 1 and radiographic system 50 relating to the present embodiment are structured like below in order to prevent such a problem from occurring. Hereinafter, there are also described functions of radiographic apparatus 1 and radiographic system 50 relating to the present embodiment at the same time.

Figure 27:
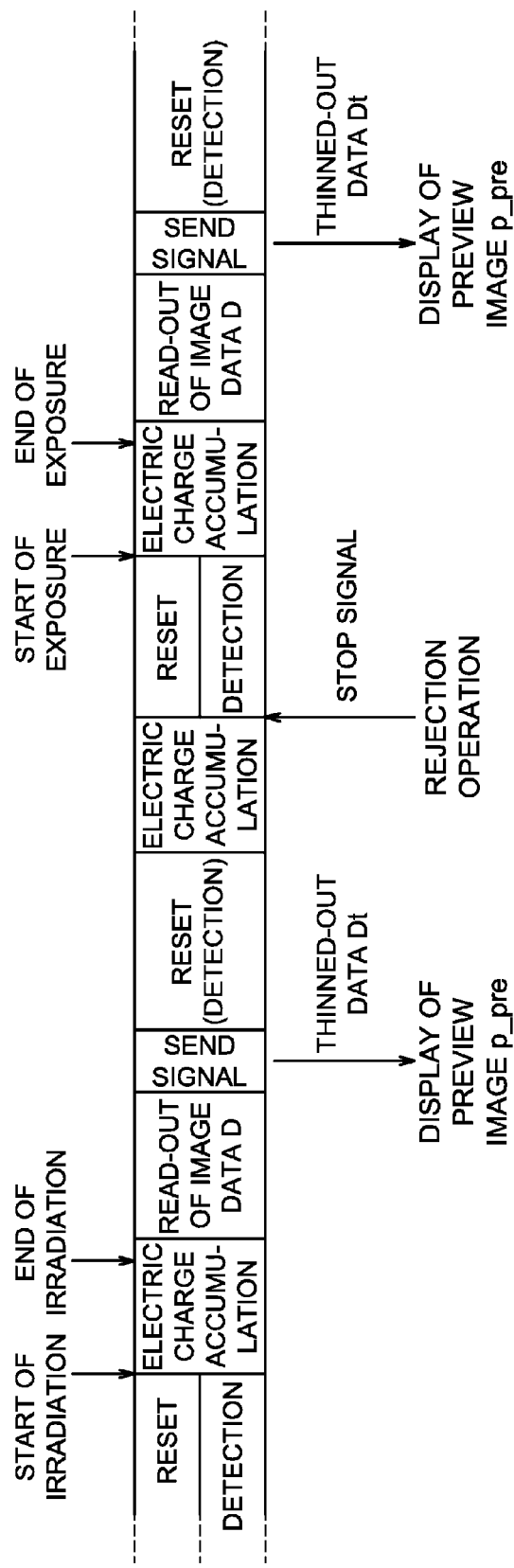
FIG. 27 is a figure showing a series of processing flow in the radiographic apparatus and console in a case where a preview image was rejected.

In the present embodiment, console 58 is structured in such a way that, when a radiological technologist, who observed preview image p_pre displayed on display section 58a, carried an operation to reject aforesaid preview image p_pre through an input unit such as a mouse (specifically, an operation to click a non-illustrated "NG" button displayed on display section 58a), console 58 transmits a stop signal to indicate that a series processing of radiographic apparatus 1 are stopped, as it is shown in FIG. 27.

Controller 22 of radiographic apparatus 1 is made so that, when receives the above stop signal from console 58, stops a series of processing which have been carried out at that time.

Namely, controller 22, when it has been carrying out reset processing of each radiation detection element 7 which has been carried out at that time, or application processing of an OFF voltage to each scanning line 5 in a charge accumulation state, stops the series of processing. In a case where controller 22 has been carrying out read-out processing of offset data O, it stops the read-out processing, or in a case where controller 22 has already been carrying out transmission processing of remaining image data D or the like, it stops the transmission processing.

Console 58 is made so that, in a case where it had already received transmission of remaining image data D or the like from radiographic apparatus 1 at that time when it transmitted a stop signal, deletes from memory section 59 above remaining image data D or the like relating to the aforesaid image capturing which it received so far.

Further, in a case where console 58 had already received offset data O of all radiation detection elements 7 from radiographic apparatus 1 at that time when console 58 transmitted a stop signal, since aforesaid offset data O are, as it was described above, data originated from only dark charges which generate in each radiation detection element 7 to which no radiation is irradiated, above offset data can be used as the offset equivalent data to subtract from thinned-out data Dt for a preview image which will be transmitted after that, as it is shown in FIG. 27.

Then, it is also possible to constitute in such a way that, in a case where console 58 had already received offset data O of all radiation detection elements 7 from radiographic apparatus 1 at that time when console 58 transmitted a stop signal, aforesaid offset data O are kept in console 58, and offset data O are used for generation processing of preview image p_pre based on thinned-out data Dt which will be transmitted after that.

On the other hand, controller 22 of radiographic apparatus 1 is made so that, when it receives a stop signal from console 58 to stop a series of processing which have been carried out at that time, it restores working conditions of each function section including scanning driving section 15 to those of pre-radiation image capturing.

Namely, in a case of the above cooperation method or method in the presence of radiological technologist, controller 22, when it receives a stop signal, stops a series of processing, and restore the system to a state (refer to FIGS. 13, 15 or the like) in which reset processing of each radiation detection element 7 of pre-radiation image capturing is allowed to be carried out.

Further, in a case where detection method 1 is adopted in the above non-cooperation method, controller 22, when it receives a stop signal, stops a series of processing, and then, restores the system to a state (refer to FIG. 21 or FIG. 23) in which read-out processing of leak data d leak of pre-radiation image capturing and reset processing of each radiation detection element 7 are allowed to be alternatively carried out (refer to FIG. 18 or FIG. 19).

Further, in a case where detection method 2 is adopted in the above non-cooperation method, controller 22, when it receives a stop signal, stops a series of processing, and then, restores the system to a state in which read-out processing of image data "d" for detection of a start of irradiation of pre-radiation image capturing is allowed to be carried out.

If it is structured in this way, in a case where a radiological technologist, who observed preview image p_pre displayed on display section 58a of console 58 after the first image capturing, decided that image re-capturing is required, and thereby operated console 58 through an input unit to reject aforesaid preview image p_pre, a stop signal is immediately transmitted from console 58 to radiographic apparatus 1. Subsequently, controller 22 of radiographic apparatus 1 promptly stops a series of processing which have been carried out at that time, to restore working conditions of each function section including scanning driving section 15 to those of pre-radiation image capturing.

Then, as it was shown in FIG. 27, when a radiological technologist rejects preview image p_pre, radiographic apparatus 1 promptly returns to working conditions of pre-radiation image capturing, to become conditions to be able to allow irradiation of radiation from radiation source 52 (refer to FIG. 11 or FIG. 12).

Accordingly, the radiological technologist who rejected preview image p_pre does not need to wait until radiographic apparatus 1 finishes a series of processing such as read-out processing of offset data O, and transmission processing of remaining image data D or the like as it was described above, and then it becomes possible, as it was shown in FIG. 27, that the radiological technologist promptly operates exposure switch 56 to irradiates radiation to radiographic apparatus 1, and thereby carries out image re-capturing.

Further, like the present embodiment, in a case where radiographic apparatus 1 is an apparatus incorporating battery 24 (refer to FIG. 7 or the like), there is no need to carry out unnecessary processing such as read-out of unnecessary offset data O, and transmission of image data D or offset data O which makes no sense to be transmitted, and thereby it becomes possible to appropriately prevent electric power of battery 24 from being wasted.

If preview image p_pre is rejected by a radiological technologist, image data D or the like, which were read out at the previous radiation image capturing (namely, radiation image capturing prior to image re-capturing), become unnecessary. Therefore, it is also possible to configure in such a way that, in a case where the above stop signal was transmitted, image data D or the like, which were read out at the previous image capturing and saved in memory section 23 (refer to FIG. 7 or the like), are deleted from memory section 23.

Further, in order to prevent power consumption to delete image data D or the like from memory section 23, it is also possible to constitute so that, for example, unnecessary image data D or the like are left to be saved in memory section 23, and image data D or the like read out at re-image capturing are saved by rewriting on aforesaid unnecessary image data D or the like.

As it was described above, according to radiographic system 50 or radiographic apparatus 1 relating to the present embodiment, in a case where there was carried out an operation by a radiological technologist to reject preview image p_pre displayed on display section 58a of console 58, a stop signal is immediately transmitted from console 58 to radiographic apparatus 1. Subsequently, controller 22 of radiographic apparatus 1, when received the stop signal, promptly stops a series of processing which have been carried out at that time, to restore working conditions of each function section including scanning driving section 15 to those of pre-radiation image capturing (refer to FIG. 27).

In this way, since radiographic apparatus 1, when a radiological technologist rejects preview image p_pre, promptly returns to working conditions of pre-radiation image capturing, to become conditions to be able to allow irradiation of radiation, it becomes possible for the radiological technologist, who rejected preview image p_pre, promptly irradiates radiation to carry out image re-capturing without waiting until radiographic apparatus 1 finishes a series of processing such as read-out processing of offset data O.

Therefore, radiographic system 50 relating to the present embodiment becomes convenient to a radiological technologist. The above merit can also be applied not only to portable radiographic apparatus 1 like the one of the present embodiment, but also to specialized radiographic apparatus 1 which is, for example, integrally formed with a non-illustrated supporting table and the like.

Further, like the present embodiment, in a case where radiographic apparatus 1 is an apparatus incorporating battery 24, there is no need to carry out unnecessary processing such as read-out of unnecessary offset data O, and transmission of image data D or offset data O which makes no sense to be transmitted, and thereby it becomes possible to appropriately prevent electric power of battery 24 from being wasted.

Accordingly, exhaustion of battery 24 can be appropriately prevented, and as a result, it becomes possible to delay running out of electric power of the battery. Then, an image capturing efficiency per charging of battery 24 may be improved to the extent corresponding to the above.

In particular, in a case where radiographic system 50 is built on nursing cart 71, as shown in, for example, FIG. 12, and has, near nursing cart 71, no equipment such as a cradle for charging battery 24, it becomes a significant issue to improve an image capturing efficiency per charging of battery 24. However, since it becomes possible, as described above, to improve an image capturing efficiency per charging of battery 24 if the present invention is adopted, a particularly effective function effect can be shown in such an above case.

In the above embodiment, as a method of detecting a start of irradiation of radiation by radiographic apparatus 1 itself in a non-cooperation method, there was described a detection method, like above detection methods 1 and 2, using each function section existing in radiographic apparatus 1 such as scanning driving section 15, and read-out circuit 17.

However, it is also possible to configure in such a way that radiographic apparatus 1 itself detects a start of irradiation of radiation by, for example, newly arranging a sensor or a detection section to detect a start of irradiation of radiation in radiographic apparatus 1 (refer, for example, to U.S. Pat. No. 7,211,803, Japanese Patent Application Publication No. 2009-219538). Even in a case where radiographic apparatus 1 is structured in such a way, the present invention may be applied.

It will be obvious that the present invention is not limited to the above embodiments, and appropriate changes can naturally be made.

According to the radiographic system and radiographic apparatus of the method in the preferred embodiment, in a case where an operation to reject a preview image was carried out by a radiological technologist, a stop signal is promptly transmitted from a console to the radiographic apparatus. Then, a controller of the radiographic apparatus, when received the stop signal, stops a series of processing which have been carried out at that time, to restore working conditions of each function section including scanning driving section 15 to those of pre-radiation image capturing.

In this way, since the radiographic apparatus, when a radiological technologist rejects a preview image, promptly returns to working conditions of pre-radiation image capturing, to become conditions to be able to allow irradiation of radiation, it becomes possible for the radiological technologist, who rejected the preview image, promptly irradiates radiation to carry out image re-capturing. Therefore, the radiographic system becomes convenient for the radiological technologist to use it.

Further, in a case where the radiographic apparatus is an apparatus incorporating a battery, there is no need to carry out unnecessary processing such as read-out of unnecessary offset data O, and transmission of image data D or offset data O which makes no sense to be transmitted, and thereby it becomes possible to appropriately prevent electric power of the battery from being wasted.

Accordingly, exhaustion of the battery can be appropriately prevented, and as a result, it becomes possible to delay running out of electric power of the battery. Then, an image capturing efficiency per charging of battery 24 may be improved to the extent corresponding to the above.

What is claimed is:
1. A radiographic system comprising:
(a) a radiographic apparatus which comprises;
(1) a plurality of scanning lines and a plurality of signal lines each which is arranged to intersect with each of the plurality of scanning lines;

(2) a plurality of radiation detecting elements which are arranged in two-dimensionally in each of small areas that are divided by the plurality of scanning lines and the plurality of signal lines;

(3) a scanning driving section which applies an on-state voltage or an off-state voltage to each of the plurality of scanning lines;

(4) a switching unit connected to each scanning line in which when the on-state voltage is applied, the switching unit causes the radiation detecting element to discharge electric charges that have been accumulated therein to the signal lines;

(5) a read-out circuit which converts the electric charges discharged from the radiation detecting element onto an image data, and reads out the image data;

(6) a controller which controls at least the scanning driving section and the read-out circuit to read out the image data from the radiation detecting element; and (7) a communication section capable of communicating with an external device;

(b) a radiation generator having a radiation source that irradiates radiation to the radiographic apparatus; and (c) a console which forms a radiation image based on the image data transmitted from the radiographic apparatus, wherein when a radiation image capturing is completed, the controller transmits thinned-out data in which the read-out image data are thinned out at a prescribed ratio, to the console, wherein the console which displays a preview image on a display section based on the thinned-out data, when a rejection operation that rejects the preview image through an input section is conducted, the console transmits a stop signal that instructs the radiographic apparatus to stop a series of processing, and wherein when the controller receives the stop signal from the console, the controller stops the series of processing currently in progress, and returns an operation state of each functional section including the scanning driving section to an operation state before the radiation image capturing is carried out.

2. The radiographic system of claim 1,
wherein after the controller transmits the thinned out data to the console, the controller is configured to conduct a read-out processing of an offset data representing an offset data for an amount of offset caused by dark charges which is superimposed in the image data for each of the radiation detecting elements, and then to transmit remaining image data and the offset data to the console, and wherein after the controller receives the stop signal, the controller stops the read-out processing of the offset data when the read-out processing of the offset data is conducted at that time, or stops a transmitting processing of the remaining image data and the offset data when the transmitting processing is carried out, and then returns an operation state of each functional section including the scanning driving section to the operation state before the radiation image capturing is carried out.

3. The radiographic system of claim 1,
wherein before the radiation image capturing is carried out, the controller controls the scanning driving section to conduct a reset processing of each of the plurality of radiation detecting elements that discharges electric charge remained in each of the plurality of radiation detecting elements to each of the signal lines, and wherein when the controller receives the stop signal from the console, the controller returns to the state in which the reset processing of each of the plurality of radiation detecting elements is carried out before the radiation image capturing is conducted.

4. The radiographic system of claim 3, wherein the radiographic apparatus further comprises an informing section which informs a state that an irradiation of radiation from the radiation source can be permitted, and the controller causes each of the plurality of radiation detecting elements to carry out prescribed times of the reset processing before the radiation image capturing is conducted, causes each of the plurality of radiation detecting elements to move to an electric charge accumulation state in which electric charges generated by an irradiation of radiation through applying an off-state voltage to each of the scanning lines from the scanning driving section, are accumulated in each of the plurality of radiation detecting elements, and causes the informing section to inform the state that the irradiation of radiation from the radiation source can be permitted.

5. The radiographic system of claim 1,
wherein before the radiation image capturing is conducted, the controller alternately causes the read-out circuit to carry out a read-out processing of a leak data in which an electric charge leaked from each of plurality of radiation detecting elements is converted into the leak data through each of the switching units in a state where each of the switching units is shut off by applying an off-state voltage from the scanning driving section to each of the scanning lines, and causes each of the plurality of radiation detecting elements to carry out a reset processing of each of the plurality of radiation detecting elements to discharge the electric charge remained in each of the plurality of radiation detecting elements to each of the signal lines by sequentially applying an on-state voltage from the scanning driving section to each of the plurality of scanning lines, and wherein when the controller receives the stop signal from the console, the controller returns to a state in which the controller alternately causes to carry out the read-out processing of the leak data before the radiation image capturing is conducted, and to carry out the reset processing of each of the plurality of radiation detecting elements.

6. The radiographic system of claim 1,
wherein before the radiation image capturing is conducted, the controller causes to carry out a read-out processing of the image data for detecting a start of an irradiation by sequentially applying an on-state voltage from the scanning driving section to each of the plurality of scanning lines, and wherein when the controller receives the stop signal from the console, the controller returns to a state in which the controller causes to carry out a read-out processing of the image data for detecting the start of the irradiation before the radiation image capturing is conducted.

7. The radiographic system of claim 5, wherein when the start of the irradiation is detected at a time when the leak data which has been read out exceeds a threshold value, after the controller causes each of the plurality of radiation detecting elements to move to an electric charge accumulation state in which electric charges generated by an irradiation of radiation by applying an off-state voltage to each of the scanning lines from the scanning driving section are accumulated into each of the plurality of radiation detecting elements, the controller causes the read-out circuit to carry out a read-out processing of the image data as a real image from each of the plurality of radiation detecting elements.

8. The radiographic system of claim 6, wherein when the start of the irradiation is detected at a time when the image data which has been read out exceeds a threshold value, after the controller causes each of the plurality of radiation detecting elements to move to an electric charge accumulation state in which electric charges generated by an irradiation of radiation by applying an off-state voltage to each of the scanning lines from the scanning driving section are accumulated into each of the plurality of radiation detecting elements, the controller causes the read-out circuit to carry out a read-out processing of the image data as a real image from each of the plurality of radiation detecting elements.

9. The radiographic system of claim 1, wherein the radiographic apparatus stores therein a battery to supply an electric power to each of functional sections.

10. A radiographic apparatus comprising:
(a) a plurality of scanning lines and a plurality of signal lines each which is arranged to intersect with each of the plurality of scanning lines;
(b) a plurality of radiation detecting elements which are arranged in two-dimensionally in each of small areas that are divided by the plurality of scanning lines and the plurality of signal lines;
(c) a scanning driving section which applies an on-state voltage or an off-state voltage to each of the plurality of scanning lines;
(d) a switching unit connected to each scanning line in which when the on-state voltage is applied, the switching unit causes the radiation detecting element to discharge electric charges that have been accumulated therein to the signal line;
(e) a read-out circuit which converts the electric charges discharged from the radiation detecting element onto an image data, and reads out the image data;
(f) a controller which controls at least the scanning driving section and the read-out circuit to read out the image data from the radiation detecting element; and
(g) a communication section capable of communicating with an external device,
wherein when a radiation image capturing is completed, the controller transmits thinned-out data in which the read-out image data have been thinned out at a prescribed ratio, to a console, and
wherein when the controller receives the stop signal from the console, the controller stops the series of processing currently in progress, and returns an operation state of each functional section including the scanning driving section to an operation state before the radiation image capturing is carried out.

\* \* \* \* \*